(12) United States Patent
Skeoch

(10) Patent No.: US 11,412,189 B1
(45) Date of Patent: *Aug. 9, 2022

(54) BATTERYLESS DOORBELL WITH MULTI-LOAD POWER DELIVERY

(71) Applicant: Amazon Technologies, Inc., Seattle, WA (US)

(72) Inventor: James Steven Skeoch, Palos Verdes Estates, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/241,780

(22) Filed: Jan. 7, 2019

(51) Int. Cl.
*G08B 3/10* (2006.01)
*H04N 7/18* (2006.01)
*H04M 11/02* (2006.01)

(52) U.S. Cl.
CPC ............ *H04N 7/186* (2013.01); *G08B 3/10* (2013.01); *H04M 11/025* (2013.01)

(58) Field of Classification Search
None
See application file for complete search history.

(56) References Cited

U.S. PATENT DOCUMENTS

| 2,909,771 A | 10/1959 | Minnich |
| 2,923,835 A | 2/1960 | Black |
| 3,774,191 A | 11/1973 | Enemark |
| 3,810,163 A * | 5/1974 | Arnold ................ G08B 23/00 340/538 |
| 4,001,816 A | 1/1977 | Yamada et al. |
| 4,213,121 A | 7/1980 | Learn |
| 4,764,953 A | 8/1988 | Chern et al. |
| 4,807,269 A | 2/1989 | Grady |

(Continued)

FOREIGN PATENT DOCUMENTS

| CN | 2585521 | 11/2003 |
| CN | 2792061 | 6/2006 |

(Continued)

OTHER PUBLICATIONS

Office Action for U.S. Appl. No. 16/241,780, dated Jan. 14, 2020, Skeoch, "Batteryless Doorbell With Multi-Load Power Delivery", 6 Pages.

(Continued)

*Primary Examiner* — Brent Swarthout
(74) *Attorney, Agent, or Firm* — Lee & Hayes, P.C.

(57) ABSTRACT

In implementations described herein, A/V recording and communication doorbell devices ("A/V doorbells") and signaling devices may be powered from a common AC waveform. In some implementations, an A/V doorbell and its corresponding signaling device may be arranged in a circuit loop where a portion of an AC waveform is used to power the A/V doorbell and the other portions of the AC waveform is used to power the signaling device. For example, a positive phase of the AC waveform may be used to power one of the A/V doorbell or signaling device and a negative phase of the AC waveform may be used to power the other of the A/V doorbell or signaling device. In some cases, an energy harvester device may be used to slow charge a battery or supercapacitor from the circuit loop to power the A/V doorbell and/or signaling device.

30 Claims, 17 Drawing Sheets

(56) References Cited

U.S. PATENT DOCUMENTS

| | | | |
|---|---|---|---|
| 5,311,168 A | 5/1994 | Pease, Jr. et al. |
| 5,428,388 A | 6/1995 | von Bauer et al. |
| 5,760,848 A | 6/1998 | Cho |
| 6,072,402 A | 6/2000 | Kniffin et al. |
| 6,192,257 B1 | 2/2001 | Ray |
| 6,271,752 B1 | 8/2001 | Vaios |
| 6,429,893 B1 | 8/2002 | Xin |
| 6,456,322 B1 | 9/2002 | Marinacci |
| 6,476,858 B1 | 11/2002 | Ramirez Diaz et al. |
| 6,633,231 B1 | 10/2003 | Okamoto et al. |
| 6,658,091 B1 | 12/2003 | Naidoo et al. |
| 6,753,774 B2 | 6/2004 | Pan et al. |
| 6,970,183 B1 | 11/2005 | Monroe |
| 7,062,291 B2 | 6/2006 | Ryley et al. |
| 7,065,196 B2 | 6/2006 | Lee |
| 7,085,361 B2 | 8/2006 | Thomas |
| 7,109,860 B2 | 9/2006 | Wang |
| 7,193,644 B2 | 3/2007 | Carter |
| 7,304,572 B2 | 12/2007 | Sheynman et al. |
| 7,382,249 B2 | 6/2008 | Fancella |
| 7,450,638 B2 | 11/2008 | Iwamura |
| 7,643,056 B2 | 1/2010 | Silsby |
| 7,683,924 B2 | 3/2010 | Oh et al. |
| 7,683,929 B2 | 3/2010 | Elazar et al. |
| 7,738,917 B2 | 6/2010 | Ryley et al. |
| 8,139,098 B2 | 3/2012 | Carter |
| 8,144,183 B2 | 3/2012 | Carter |
| 8,154,581 B2 | 4/2012 | Carter |
| 8,619,136 B2 | 12/2013 | Howarter et al. |
| 8,780,201 B1 | 7/2014 | Scalisi et al. |
| 8,823,795 B1 | 9/2014 | Scalisi et al. |
| 8,842,180 B1 | 9/2014 | Kasmir et al. |
| 8,872,915 B1 | 10/2014 | Scalisi et al. |
| 8,937,659 B1 | 1/2015 | Scalisi et al. |
| 8,941,736 B1 | 1/2015 | Scalisi |
| 8,947,530 B1 | 2/2015 | Scalisi |
| 8,953,040 B1 | 2/2015 | Scalisi et al. |
| 9,013,575 B2 | 4/2015 | Scalisi |
| 9,049,352 B2 | 6/2015 | Scalisi et al. |
| 9,053,622 B2 | 6/2015 | Scalis |
| 9,058,738 B1 | 6/2015 | Scalisi |
| 9,060,103 B2 | 6/2015 | Scalisi |
| 9,060,104 B2 | 6/2015 | Scalisi |
| 9,065,987 B2 | 6/2015 | Kasmir et al. |
| 9,094,584 B2 | 7/2015 | Scalisi et al. |
| 9,113,051 B1 | 8/2015 | Scalisi |
| 9,113,052 B1 | 8/2015 | Scalisi et al. |
| 9,118,819 B1 | 8/2015 | Scalisi et al. |
| 9,142,214 B2 | 9/2015 | Scalisi |
| 9,160,987 B1 | 10/2015 | Kasmir et al. |
| 9,165,444 B2 | 10/2015 | Scalis |
| 9,172,920 B1 | 10/2015 | Kasmir et al. |
| 9,172,921 B1 | 10/2015 | Scalisi et al. |
| 9,172,922 B1 | 10/2015 | Kasmir et al. |
| 9,179,107 B1 | 11/2015 | Scalisi et al. |
| 9,179,108 B1 | 11/2015 | Scalisi et al. |
| 9,179,109 B1 | 11/2015 | Kasmir et al. |
| 9,196,133 B2 | 11/2015 | Scalisi et al. |
| 9,197,867 B1 | 11/2015 | Scalisi et al. |
| 9,230,424 B1 | 1/2016 | Scalisi et al. |
| 9,237,318 B2 | 1/2016 | Kasmir et al. |
| 9,247,219 B2 | 1/2016 | Kasmir et al. |
| 9,253,455 B1 | 2/2016 | Harrison et al. |
| 9,342,936 B2 | 5/2016 | Scalisi |
| 9,508,239 B1 | 11/2016 | Harrison et al. |
| 9,736,284 B2 | 8/2017 | Scalisi et al. |
| 9,743,049 B2 | 8/2017 | Scalisi et al. |
| 9,769,435 B2 | 9/2017 | Scalisi et al. |
| 9,786,133 B2 | 10/2017 | Harrison et al. |
| 9,799,183 B2 | 10/2017 | Harrison et al. |
| 10,070,058 B2 | 9/2018 | Siminoff et al. |
| 10,311,685 B1 * | 6/2019 | Long .............. H02J 3/12 |
| 10,567,711 B1 * | 2/2020 | Skeoch ............ H02M 7/02 |
| 10,607,458 B1 | 3/2020 | Sampson et al. |
| 10,609,344 B1 | 3/2020 | Tso |
| 2002/0094111 A1 | 7/2002 | Puchek et al. |
| 2002/0147982 A1 | 10/2002 | Naidoo et al. |
| 2003/0043047 A1 | 3/2003 | Braun |
| 2004/0085205 A1 | 5/2004 | Yeh |
| 2004/0085450 A1 | 5/2004 | Stuart |
| 2004/0086093 A1 | 5/2004 | Schranz |
| 2004/0095254 A1 | 5/2004 | Maruszczak |
| 2004/0135686 A1 | 7/2004 | Parker |
| 2005/0111660 A1 | 5/2005 | Hosoda |
| 2006/0010199 A1 | 1/2006 | Brailean et al. |
| 2006/0022816 A1 | 2/2006 | Yukawa |
| 2006/0139449 A1 | 6/2006 | Cheng et al. |
| 2006/0156361 A1 | 7/2006 | Wang et al. |
| 2007/0008081 A1 | 1/2007 | Tylicki et al. |
| 2007/0126574 A1 | 6/2007 | Langer et al. |
| 2008/0164766 A1 | 7/2008 | Adest |
| 2010/0134047 A1 | 6/2010 | Hasnain |
| 2010/0225455 A1 | 9/2010 | Claiborne et al. |
| 2010/0245060 A1 * | 9/2010 | Tylicki .............. G08B 3/10 340/393.3 |
| 2013/0057695 A1 | 3/2013 | Huisking |
| 2014/0267716 A1 | 9/2014 | Child et al. |
| 2015/0035987 A1 | 2/2015 | Fernandez |
| 2015/0100183 A1 | 4/2015 | Youngquist |
| 2015/0163463 A1 | 6/2015 | Hwang et al. |
| 2015/0339895 A1 | 11/2015 | Chen et al. |
| 2015/0341603 A1 | 11/2015 | Kasmir |
| 2017/0171517 A1 | 6/2017 | Modestine |
| 2017/0193763 A1 | 7/2017 | Wei et al. |
| 2017/0213428 A1 | 7/2017 | Lamas |
| 2017/0221319 A1 * | 8/2017 | Chen .............. H01H 13/52 |
| 2017/0272652 A1 | 9/2017 | Siminoff et al. |
| 2017/0272706 A1 | 9/2017 | Jeong |
| 2017/0294694 A1 | 10/2017 | Tso |
| 2018/0035051 A1 | 2/2018 | Siminoff et al. |
| 2018/0091569 A1 * | 3/2018 | Roth ............. G08B 3/10 |
| 2018/0176512 A1 | 6/2018 | Siminoff |
| 2018/0190083 A1 | 7/2018 | Wu |
| 2018/0192009 A1 | 7/2018 | Jeong |
| 2018/0308328 A1 | 10/2018 | Siminoff |
| 2018/0322743 A1 | 11/2018 | Chen et al. |
| 2020/0005604 A1 * | 1/2020 | Long .............. H02J 3/12 |
| 2020/0005625 A1 * | 1/2020 | Conner ............ G08B 29/02 |

FOREIGN PATENT DOCUMENTS

| | | |
|---|---|---|
| EP | 0944883 | 9/1999 |
| EP | 1480462 | 11/2004 |
| GB | 2286283 | 8/1995 |
| GB | 2354394 | 3/2001 |
| GB | 2357387 | 6/2001 |
| GB | 2400958 | 10/2004 |
| JP | 2001103463 | 4/2001 |
| JP | 2002033839 | 1/2002 |
| JP | 2002125059 | 4/2002 |
| JP | 2002342863 | 11/2002 |
| JP | 2002344640 | 11/2002 |
| JP | 2002354137 | 12/2002 |
| JP | 2002368890 | 12/2002 |
| JP | 2003283696 | 10/2003 |
| JP | 2004128835 | 4/2004 |
| JP | 2005341040 | 12/2005 |
| JP | 2006147650 | 6/2006 |
| JP | 2006262342 | 9/2006 |
| JP | 2009008925 | 1/2009 |
| WO | WO9839894 | 9/1998 |
| WO | WO0113638 | 2/2001 |
| WO | WO0193220 | 12/2001 |
| WO | WO02085019 | 10/2002 |
| WO | WO03028375 | 4/2003 |
| WO | WO03096696 | 11/2003 |
| WO | WO2006038760 | 4/2006 |
| WO | WO2006067782 | 6/2006 |
| WO | WO2007125143 | 11/2007 |

(56) References Cited

OTHER PUBLICATIONS

Office Action for U.S. Appl. No. 16/241,816, dated Feb. 5, 2020, Skeoch, "Batteryless Doorbell With Energy Harvesters", 16 Pages.

Office Action for U.S. Appl. No. 16/733,090, dated Sep. 21, 2020, Skeoch, "Batteryless Doorbell With Rectified Power Delivery", 10 Pages.

Office Action for U.S. Appl. No. 16/733,090, dated May 7, 2021, Skeoch, "Batteryless Doorbell With Rectified Power Delivery", 12 pages.

* cited by examiner

BATTERYLESS DOORBELL WITH MULTI-LOAD POWER DELIVERY

BACKGROUND

Home security is a concern for many homeowners and renters. Those seeking to protect or monitor their homes often wish to have video and audio communications with visitors, for example, those visiting an external door or entryway. A/V recording and communication doorbell devices provide this functionality and can also aid in crime detection and prevention. For example, audio and/or video captured by an A/V recording and communication doorbell device can be uploaded to the cloud and recorded on a remote server. Subsequent review of the A/V footage can aid law enforcement in capturing perpetrators of home burglaries and other crimes. Further, the presence of one or more A/V recording and communication doorbell devices on the exterior of a home, such as a doorbell unit at the entrance to the home, acts as a powerful deterrent against would-be burglars.

BRIEF DESCRIPTION OF THE DRAWINGS

Embodiments of the present batteryless doorbell with multi-load power delivery are described below with reference to the accompanying figures. In the figures, in most cases, the left-most digit(s) of a reference number identifies the figure in which the reference number first appears. The use of the same reference numbers in different figures indicates similar or identical components and/or features.

DETAILED DESCRIPTION

Figure 1:
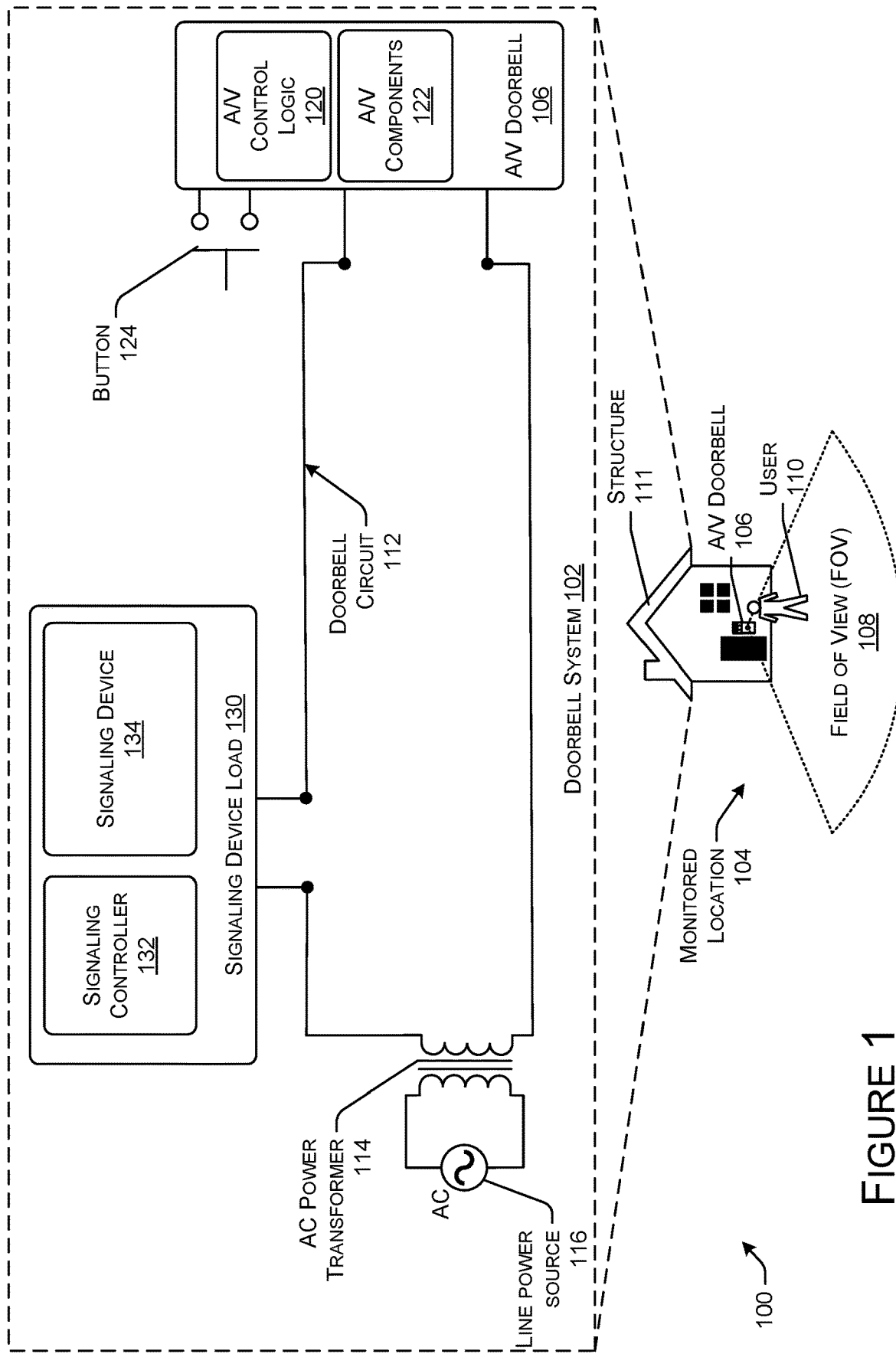
FIG. 1 is a schematic diagram illustrating an example environment that includes an audio/video (A/V) recording and communication doorbell device ("A/V doorbell") and a signaling device load operable from a single alternating current power supply, according to various aspects of the present disclosure.

According to example embodiments, an audio/video (A/V) recording and communication doorbell device ("A/V doorbell" or "A/V doorbell"), as well as one or more signaling devices coupled to the A/V doorbell, may be powered from a single power source and/or without the use of a battery. The A/V doorbell along with a signaling device coupled to the A/V doorbell may be provided power from a single alternating current (AC) line power source. In other words, AC line power may be used to supply direct current (DC) power to two different loads, namely the A/V doorbell and a signaling device coupled with the A/V doorbell. In further example embodiments, the A/V doorbell and the signaling device may be arranged in series when drawing power from the single AC line power source. In still further example embodiments, the signaling device may be triggered based at least in part on a disruption or change in current supplied to and/or monitored by a signaling controller when a button (e.g., doorbell button) on the A/V doorbell is pressed. In still further example embodiments, energy harvesting devices may be used to harvest energy that is to be used for the A/V doorbell, the signaling device, and/or to charge an energy storage device used to power the signaling device.

The A/V doorbell may be located near an external door of a structure, such as a house, office building, apartment, condominium, store front, and the like. The A/V doorbell may be positioned to capture audio and/or video data of a space outside of the structure that is proximate to the external door. In this way, persons that occupy and/or own the structure may obtain audio and/or video data related to activity around the external door. For example, the A/V doorbell may capture audio and/or video data of persons attempting to gain access to the structure. In other examples, the A/V doorbell may capture audio and/or video data of persons attempting to make a delivery to the structure. By providing audio and/or video data of the outside of structures, the A/V doorbell may help to prevent unwanted access to the structures and/or prevent damage to the structures by alerting occupants of the structures to unwanted persons that are near the structures.

The one or more signaling devices, as described herein, may produce sound to alert an occupant of a structure (e.g., house) that a person external to the structure is attempting to communicate with the occupant. In various implementations, an A/V doorbell may include a button (e.g., a doorbell button) that is selectable to activate a signaling device within the structure. In certain implementations, structures may include preexisting doorbell power circuitry that may activate signaling devices that are located within the structures. The signaling devices may be activated in response to input at a doorbell activation device that is located near an external door. The doorbell activation device may include a button that is located near an external door of a structure and electrically coupled to a signaling device via the doorbell power circuitry. The implementations of the A/V doorbells described herein may be coupled to the doorbell power circuitry and used instead of, or in addition to, preexisting doorbell activation devices.

In conventional doorbell systems (e.g., non-A/V doorbells), power is applied to a signaling device in response a person pressing a doorbell activation device (e.g., a doorbell button) disposed on an exterior of a structure. The amount of power supplied activates the signaling device to produce a sound to alert an occupant of the structure. In implementations of the disclosure, the A/V doorbells may replace the doorbell button of conventional systems. According to example embodiments of the disclosure, the A/V doorbells may include one or more functional components that draw power from the preexisting doorbell power circuitry to operate. For example, the A/V doorbells may include one or more cameras, one or more microphones, one or more communication systems, one or more lighting devices, one or more additional sensors, one or more processors, memory, combinations thereof, and the like, that may use power for operation. As disclosed herein, the doorbell power circuitry used in traditional doorbell systems may be used for powering the A/V doorbell and the signaling device. In these example embodiments, the A/V doorbell may be arranged in a series circuit (e.g., doorbell circuit) with the signaling device and both the A/V doorbell and the signaling device may draw power from the series circuit. Additionally, in some example embodiments, the series circuit may further be used for signaling from the A/V doorbell to a signaling device controller that the signaling device is to be activated, such as in response to the doorbell button being pressed.

Traditionally, A/V doorbell systems are powered from two different power sources. For example, A/V doorbells may be powered using batteries, while the signaling device may be powered from a home AC power source. The disclosure herein allows for both the A/V doorbell and an associated signaling device to be powered from a common home power source, such as a single-phase, 110-240 Volt, 60 or 50 Hz AC line power source. The A/V doorbell and the signaling device may be arranged in a series configuration or loop coupled to a step-down side of a transformer. One or more portions of a particular polarity (e.g., positive polarity or negative polarity) may be used to power the A/V doorbell, while one or more portions of an opposite polarity (e.g., negative polarity or positive polarity) may be used to power the signaling device and its related circuitry. For example, the positive phase of the AC power supply may be used to power the signaling device, while the negative phase of the AC power supply may be used to power the A/V doorbell.

As discussed herein, in some conventional systems, A/V doorbells may include a battery to supply power to one or more functional components of the A/V doorbells. The battery may include a rechargeable battery that is recharged by drawing power from the doorbell power circuitry. In particular, power may be supplied by the battery to functional components of the A/V doorbells in situations where the A/V doorbells are unable to draw sufficient power from the doorbell power circuitry to operate the functional components. Typically, batteries have a limited number of charge and discharge cycles, and batteries charge and discharge at relatively slow rates. Additionally, the lifetime of a battery, and/or the satisfactory performance of a battery, may be constrained to a given range of temperatures. For example, the performance and/or lifetimes of batteries may be reduced when operating in extreme temperatures, such as less than 10° C. and/or greater than 35° C. Further still, other environmental factors, such as humidity, may reduce the performance and/or lifetime of batteries that may be used for powering the A/V doorbell. Thus, the incorporation of energy storage devices, such as rechargeable batteries, in potentially harsh conditions to which the A/V doorbells may be subjected may result in reduced mean time to failure (MTTF) of the energy storage devices.

In embodiments described herein, A/V doorbells may operate from line power, without the use of batteries and/or supercapacitors at the A/V doorbell, thus overcoming the infirmities of using energy storage devices in harsh environmental conditions where the A/V doorbells may be deployed. Additionally, fewer parts may be used to implement an A/V doorbell system, as a result of the disclosure herein, compared to conventional systems. Further still, the A/V doorbell system as disclosed herein may be more reliable and/or less expensive compared to conventional implementations due to the use of fewer parts. Furthermore, the A/V doorbell, as well as the corresponding signaling device may be wired in a circuit using legacy wiring that may be available for traditional analog doorbells. In some embodiments, the circuit itself may be used for the purposes of communicating between the A/V doorbell and the signaling device and related components (e.g., signaling device controller).

In some example embodiments, AC line power may be provided to a step-down transformer that provides an AC waveform voltage in the range of about 8 volts to 24 volts to the A/V doorbell circuit. The AC waveform may be applied to a first half-wave bridge rectifier and a second half-wave bridge rectifier. The waveform from the output of the first half-wave bridge rectifier may be provided to a signaling device load that may include the signaling device and related components, such as a signaling device controller. The waveform from the output of the second half-wave bridge rectifier may be applied to the A/V doorbell. The waveform at the output of the first half-wave bridge rectifier may be out of phase with the waveform at the output of the second half-wave bridge rectifier. For example, the first half-wave bridge rectifier may provide the positive phase of the AC waveform to the signaling device load, while the second half-wave bridge rectifier may provide the negative phase of the AC waveform to the A/V doorbell. In other words, the first half-wave bridge rectifier may generate a rectified output of the positive phase of the AC waveform and the second half-bridge rectifier may generate a rectified output of the negative phase of the AC waveform. In some cases, a smoothing capacitor or other component(s) that provides reactance may be provided at the output of the first half-wave bridge rectifier and/or the second half-wave bridge rectifier. The smoothing capacitor may smooth the rectified waveform to resemble a direct current (DC) power source to each of the A/V doorbell and the signaling device load.

The use of two half-wave rectifiers may provide a rectified power source for each of the A/V doorbell and the signaling device load. In other words, a single power supply, such as the AC line voltage, may be stepped down, half-wave rectified to generate two rectified waveforms of opposite phase, smoothed, and provided as a power source to each of the A/V doorbell and the signaling device. Although discussed in the context of an A/V doorbell system, the mechanism and apparatus, as described herein, may be used to power any two different loads in the same circuit and/or system in a wide variety of applications. Indeed, two out-of-phase rectified waveforms may be generated and smoothed, and each waveform may be used to provide DC power to two different components of a single system.

In some example embodiments, the amount of power supplied and/or the maximum power available to the A/V doorbell and the signaling device may not be equal. In these cases, a switching mechanism controlled by a controller at the signaling device and/or the A/V doorbell may be used to rectify a portion of the AC waveform. For example, every fifth positive phase of the AC waveform may be rectified and used for the signaling device, while the remainder of the AC waveform may be used for powering the A/V doorbell. In this case, the level of power available to the signaling device load and the A/V doorbell may be different from each other. In these embodiments, two phase selection switches may be used, where one phase selection switch may select portions of the AC waveform that are to power the A/V doorbell and the other phase selection switch may be used to select the portions of the AC waveform that are to power the signaling device load. The phase selection switch for the signaling device may be controlled by the signaling controller, and the phase selection switch for the A/V doorbell may be controlled by the A/V doorbell logic. The two phase selection switches may be modulated out of phase with each other (e.g., 180-degrees out of phase). In other words, when one of the phase selection switches is closed, the other phase selection switch may be open, and vice-versa.

In further example embodiments, one or more energy harvesting devices may be provided for the signaling device and/or the A/V doorbell. A first energy harvester may both provide power to the signaling device load and also charge up an energy storage device, such as a supercapacitor or a rechargeable battery. A second energy harvester may provide energy to the A/V doorbell. When the doorbell button is pressed, a signal controller may cause the energy stored in the energy storage device to discharge into the signaling device.

In the example embodiments as discussed herein, there may be a switch that may be controlled by the A/V doorbell. When a doorbell button of the A/V doorbell is pressed, such as by a person who wants to alert another person within a structure (e.g., home) to his presence, the A/V doorbell may control a switch to either open or close. This modulation of the switch may cause an alteration and/or disruption in the current flowing through a signaling detector of the A/V doorbell circuit that may be detected by a signaling controller. Upon detection of the alteration and/or disruption in the A/V doorbell circuit, the signaling controller may cause the signaling device to make a sound, such as by actuating a signal control switch that energizes the signaling device.

The remaining detailed description describes the present implementations with reference to the drawings. In the drawings, reference numbers label elements of the present implementations. These reference numbers are reproduced below in connection with the discussion of the corresponding drawing features.

FIG. 1 is a schematic diagram illustrating an example environment 100 that includes a doorbell system 102 for powering a doorbell device of a monitored location 104. In some examples, the doorbell device may be an audio and video (AN) recording and communication doorbell device 106 (also referred to herein as A/V doorbell 106) that monitors a field of view (FOV) 108 in front of the monitored location, where the field of view 108 includes a user 110 that is approaching the A/V doorbell 106.

As illustrated, the monitored location 104 may include a structure 111 (e.g., a house) that is being monitored by the A/V doorbell 106 according to the FOV 108 of the A/V doorbell 106. The A/V doorbell 106 may monitor the physical environment in the FOV 108 for various reasons, including security, to identify or otherwise view people within a threshold proximity to the monitored location 104. In some examples, the A/V doorbell 106 may be positioned at a location on a home similar to traditional doorbell devices, and may include a doorbell button to receive input for causing a doorbell signaling device inside the structure 111 to emit sound. The A/V doorbell 106 may include one or more motion sensors that are at least periodically powered on to detect motion within the FOV 108 of the A/V doorbell 106 (e.g., passive infrared (PIR) motion sensors, active infrared (AIR) motion sensors, computer vision modules (CVM), etc.). In some examples, based on detecting motion within the FOV 108 of the A/V doorbell 106, the A/V doorbell 106 may activate (e.g., turn on, provide power to, etc.) a camera to begin generating image data. In further examples, based on detecting motion within a motion zone located within the FOV 108 of the A/V doorbell 106, the A/V doorbell 106 may begin generating the image data using the camera, and begin transmitting the image data over one or more networks (e.g., WANs, PANs, LANs, MANs, or any other network and/or combination thereof) to one or more network devices.

In some embodiments, the camera may always be powered on and recording image data (e.g., video). The video may be continuously written to a rolling buffer at the A/V doorbell 106. Then, when motion is detected in the FOV 108, video may cease being written to the rolling buffer and may instead be transmitted over the one or more networks (e.g., WANs, PANs, LANs, MANs, or any other network and/or combination thereof) to the one or more network devices. In these embodiments, the camera may be used for motion detection, for example by comparing successive video frames to determine whether motion is present in the FOV 108 (e.g., when it is determined that at least a threshold number of pixels have changed between successive video frames). In these embodiments, the A/V doorbell 106 may or may not include a separate motion sensor.

In some examples, the image data may always be generated and may always be transmitted to the network device(s) (e.g., 24/7 video recording). However, in some examples the A/V doorbell 106 may initially send a motion-based notification to the network device(s), which is in turn relayed to a client device (e.g., a smartphone) registered for a user that is associated with the A/V doorbell 106. Once the client device has received the notification (e.g., a push notification) indicating that the A/V doorbell 106 has detected motion, the user may provide input to the client device that indicates they would like to view what is happening in the physical environment (the FOV 108). In such examples, the A/V doorbell 106 may be instructed by the network device(s) to start generating the image data and transmitting the image data to the network devices, which in turn may relay the image data to the client device.

Additionally, the A/V doorbell 106 may include a microphone to generate audio data (such as speech of the user 110) and may further include a speaker to output audio data (such as speech from a remote user operating the client device). In this way, the A/V doorbell 106 may perform various operations for monitoring the monitored location 104, such as using a motion sensor and/or camera to detect movement, using a camera to capture image data representing the FOV 108, using a microphone to generate audio data, using a loudspeaker to output audio data, and/or transmitting image data and/or audio data over network(s) to backend servers and/or client devices.

Additionally, the A/V doorbell 106 may include a button that may receive input (e.g., capacitive-touch input, press input, near-touch input, etc.) to cause a doorbell signaling device to emit a sound. Thus, not only may the A/V doorbell 106 include a doorbell button 124 to receive input to cause a signaling device 134 to emit a sound, similar to a traditional doorbell device, but the A/V doorbell 106 may perform the additional functionality described above. In light of these types of functions, the A/V doorbell 106 may draw additional AC power, and/or additional AC current, compared to traditional doorbell devices.

As shown in FIG. 1, the doorbell system 102 may include the A/V doorbell 106 that is connected to a doorbell circuit 112, and may further include a signaling device load 130 connected to the doorbell circuit 112 between the A/V doorbell 106 and an AC power source 116. The signaling device load 130 may include a number of components, such as a signaling controller 132 and a signaling device 134. The signaling device 134 may be mechanical or electronic, in various embodiments. A mechanical signaling device creates its sound by using physical bells or bars and a mechanical hammer, and makes a traditional "ding-dong" sound. An electronic signaling device plays pre-recorded digital tones through a speaker.

The AC power source 116 may be a line power source, and may be provided to an AC power transformer 114, also referred to herein as a step-down transformer 114. The transformer 114 may step down an AC voltage to an operating voltage for the signaling device load 130 and/or the A/V doorbell 106, such as a step-down from 120 volts AC to an operating voltage of 8-24 volts AC. The step-down transformer 114 may have any suitable coil ratio, such as in the range of about 5:1 to about 15:1. The A/V doorbell 106 and/or the signaling device load 130 may draw AC power, and thus AC current, from the AC power source 116 stepped down to an AC waveform to power various loads. For example, the signaling device load 130 may draw AC power to the signaling device 134 to emit a sound upon receiving a large enough amount of AC power from an AC waveform generated from the AC power source 116. Similarly, the A/V doorbell 106 may draw AC power from the AC waveform flowing in the doorbell circuit 112 and generated from a step down of the AC power source 116 to power various components, such as A/V control logic 120 and/or A/V components 122, such as a wireless communication component, a camera, a microphone, a loudspeaker, etc.

The A/V doorbell 106 and the signaling device load 130 are shown to be in a series loop configuration on the doorbell circuit 112, but may draw power from different portions of the AC waveform flowing through the doorbell circuit 112, as described in detail in FIGS. 2A-6C. A single AC line power source 116 may thus be voltage scaled by the AC power transformer 114 to generate an AC waveform. The AC waveform carried through the doorbell circuit may then be partitioned in a manner where one partition is used to power the signaling device load 130, while the other partition is used to power the A/V doorbell 106.

The doorbell circuit 112 may include additional electronic components (not shown) that may allow for the selection of the portions of the AC waveform that are to power each of the signaling device load 130 and the A/V doorbell 106. These additional electronic components may include, for example, diodes, half-wave bridge rectifiers, energy harvesters, phase selection switches, combinations thereof, or the like. Implementations using one or more of the aforementioned electronic devices are described herein with reference to other figures of the disclosure.

It would be disadvantageous for the signaling device 134 to sound at any time other than when the doorbell button 124 is pressed, because any inadvertent sounding of the signaling device 134 would not only be bothersome to the home's occupant(s), but would also undermine the usefulness of the doorbell. To prevent inadvertent sounding of the signaling device 134, the signaling controller 132 may be coupled to the signaling device 134 to, among other functions, provide a bypass for the AC power to flow around the signaling device 134 when the signaling device 134 is not to be activated.

The signaling device load 130 may include a shunt (not shown) that may be connected in parallel with the signaling device load 130. The shunt may facilitate the ability of the A/V doorbell 106 to draw power from the AC power source 116 without inadvertently triggering the signaling device 134 to sound. The shunt, during normal standby operation, presents a relatively low electrical impedance, such as a few ohms, across the terminals of the signaling device load 130.

According to example embodiments, the A/V doorbell 106 may include A/V control logic 120 that may determine that the user 110 pressed the doorbell button 124 of the A/V doorbell 106. In such examples, the A/V doorbell 106 may provide an indication to the signaling controller 132 that the signaling device 134 is to be activated. As discussed herein, the indication to the signaling controller 132 that the signaling device is to be activated may be by way of altering and/or disrupting, for a threshold period of time, a current that flows to the signaling device load 130 or is monitored by the signaling controller 132. Alternatively, the indication that the doorbell button 124 has been pressed may entail any variety of out-of-band communications, such as via Wi-Fi, Bluetooth, Bluetooth Low Energy (BLE), etc.

Figure 2A:
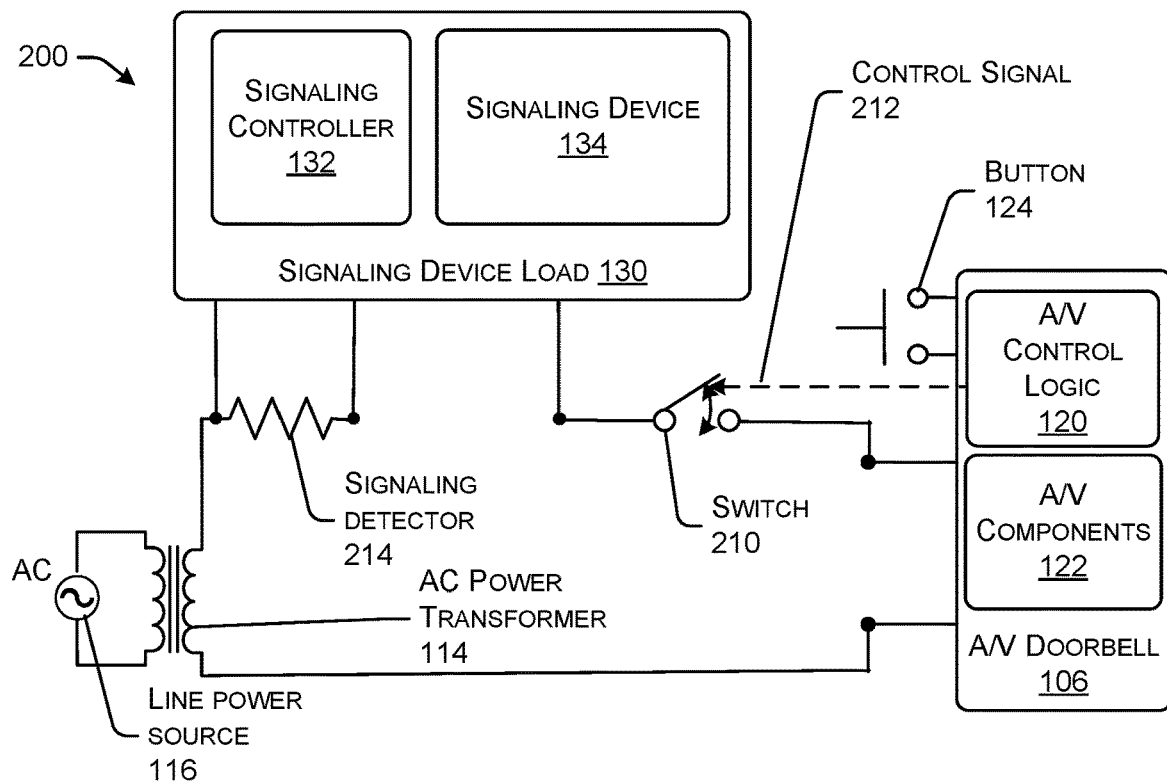
FIGS. 2A and 2B are schematic diagrams of A/V doorbell circuits with signaling between the A/V doorbell and the signaling device load, according to various aspects of the present disclosure.
Figure 2B:
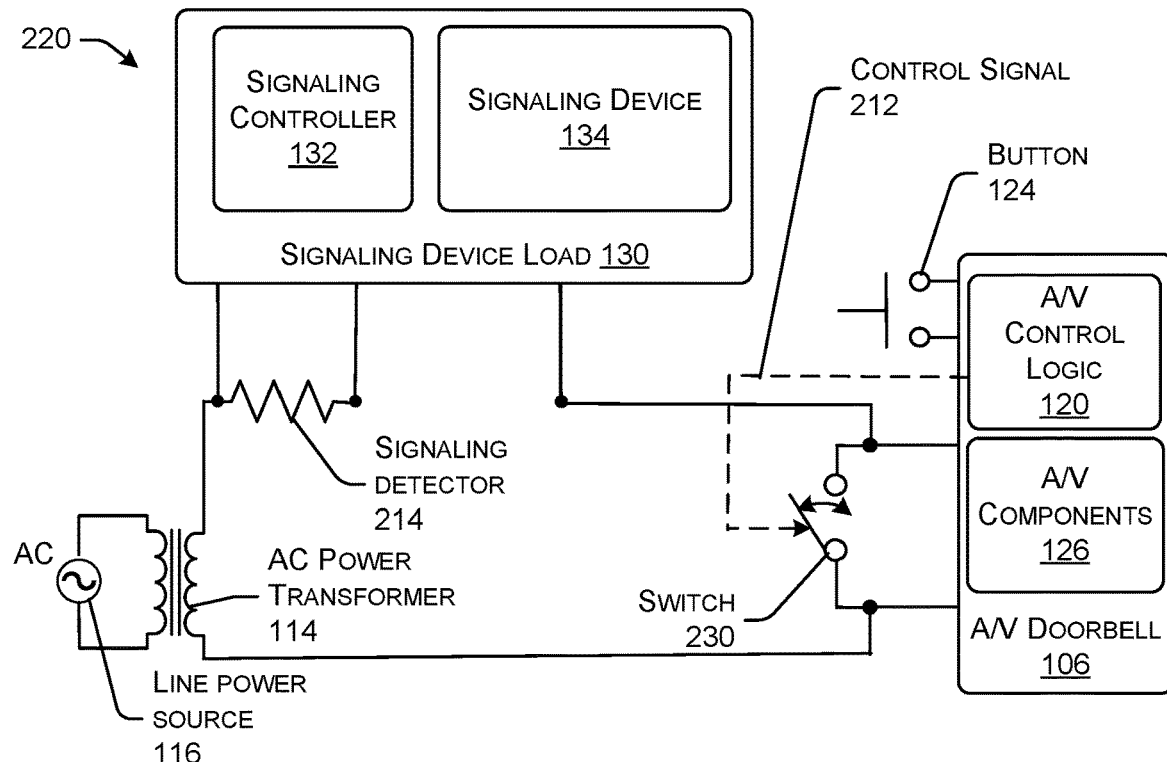

FIGS. 2A and 2B are schematic diagrams of A/V doorbell circuits 200, 220 with signaling between the A/V doorbell 106 and the signaling controller 132, according to various aspects of the present disclosure. As shown, the A/V doorbell 106 and the signaling device load 130 may be provided in a series connection similar to the doorbell circuit 112 of FIG. 1. Thus, the A/V doorbell 106 and signaling device load 130 may both draw power from an AC waveform generated from the line power source 116 provided to the AC power transformer 114. As described herein, the A/V doorbell 106 may be powered from a (first) portion of the AC waveform, while the signaling device load 130 may be powered from the opposing (second) portion of the AC waveform. For example, the A/V doorbell 106 may be powered from the positive phase of the AC waveform (e.g., the portions of the AC waveform that are a positive voltage and/or current) and the signaling device load 130 may be powered by the negative phase of the AC waveform (e.g., the portions of the AC waveform that are a negative voltage and/or current).

The doorbell circuits 200, 220 may include additional electronic components (not shown) that may allow for the selection of the portions of the AC waveform that are to power each of the signaling device load 130 and the A/V doorbell 106. These additional electronic components may include, for example, diodes, half-wave bridge rectifiers, energy harvesters, phase selection switches, combinations thereof, or the like. Implementations using one or more of the aforementioned electronic devices are described herein with reference to other figures of the disclosure.

With reference to FIG. 2A, the doorbell circuit 200 may include a switch 210 that may be controlled by a control signal 212 generated by the A/V control logic 120 of the A/V doorbell 106. The A/V control logic 120 may detect when the doorbell button 124 has been pressed. For example, a person (e.g., the user 110) who wants to announce his or her arrival may press the doorbell button 124 of the A/V doorbell 106 at the structure 111. The pressing of the button 124 may generate a signal that may be received by the A/V control logic 120 to determine that the button 124 has been pressed. Responsive to receiving the signal indicating that the button has been pressed, the A/V control logic 120 may generate the control signal to cause the switch 210 to toggle. For example, the control signal 212, as generated based at least in part on the button 124 being pressed, may close the switch 210.

The signal relay 210 may comprise, or include, any type of electrical-based switch, mechanical-based switch, and/or electromechanical-based switch. For instance, signal relay 210 may include, and/or be driven by, a triac (Triode for Alternating Current) device, a transistor device (e.g., a BJT (Bipolar Junction Transistor), a MOSFET (Metal-Oxide Semiconductor Field-Effect Transistor), etc.), a solenoid, and/or any other type of switching mechanism or device.

The A/V control logic 120 may alter the AC waveform of the doorbell circuit 200 for a threshold amount of time and/or for a threshold portion or number of cycles of the AC waveform. For example, the A/V control logic 120 may alter and/or disrupt the AC waveform for one-eighth of a cycle, one-quarter of a cycle, one-half of a cycle, a full cycle, or any suitable predetermined number of cycles or part of a cycle. For example, if the AC waveform is a 60 Hz signal, and the A/V control logic 120 is to alter the AC waveform for one-quarter of a cycle, then the signal relay may be actuated (e.g., closed) for 0.25*(1/60) seconds, or 4.17 milliseconds (ms).

By closing the signal relay 210, the current flowing through the doorbell circuit 200 may be altered and/or disrupted. The signaling controller 132 may be able to detect that the current flowing through the doorbell circuit has been disrupted and, based at least in part on the disruption, the signaling controller 132 may determine that the signaling device 134 is to be energized or powered to produce a sound. Thus, responsive to detecting the alteration in the current flowing through the doorbell circuit 200, the signaling controller 132 may cause the signaling device 134 to make a sound for a predetermined amount of time. For example, the predetermined amount of time may be about one second when the signaling device 134 is mechanical, or about 5 seconds when the signaling device 134 is digital. These amounts, however, are only examples of threshold times, and the threshold amount of time to energize the signaling device 134 may be any suitable amount of time.

According to example embodiments, the signaling controller 132 may be able to detect an altered current by monitoring the current through a signaling detector 214. The signaling detector 214 may be a resistor, such as a current-sense resistor, or any other electronic device that presents an impedance, such that the current therethrough and/or the voltage thereacross may be determined. The current flowing through the signaling detector 214 may be altered when the signal relay 210 is toggled, such as when the signal relay 210 is closed. The signaling controller 132 may detect the alteration in the current flowing through the signaling detector 214, such as by detecting a drop in voltage across the signaling detector 214. Determining that there is an alteration in the current flowing through the signaling detector 214 may be an indication to the signaling controller 132 that the doorbell button 124 has been pressed and/or that the signaling device 134 is to be activated to emit sound and/or other signals (e.g., light) to indicate that the doorbell button 124 has been pressed. As discussed with reference to the signal relay 210, the current through the signaling detector 214 may be altered and/or disrupted for a threshold amount of time and/or a threshold number of cycles or part of a cycle of the AC waveform of the doorbell circuit 200. For example, the current through the signaling detector 214 may be disrupted for one-quarter of a cycle or one-half of a cycle of the AC waveform for the signaling controller 132 to determine that the signaling device 134 is to be activated. The minimum threshold of alteration of the voltage across the signaling detector 214 may be implemented such that noise in the AC waveform does not trigger unwanted activation of the signaling device 134.

The doorbell circuit 220 of FIG. 2B is similar to the doorbell circuit 200 of FIG. 2A, but with the switch 230 connected in parallel with the A/V doorbell 106. In this configuration, when the signal relay 210 is toggled, or closed, by the A/V control logic 120 responsive to the doorbell button 124 being pressed, the A/V doorbell 106 may not experience any disruption in receiving power from the doorbell circuit 220. The description of the signal relay 230 may be similar to the description of the signal relay 210. For example, the signal relay 230 may be any suitable switching device, such as a MOSFET or BJT, that can be actuated by the control signal 212. For example, the control signal 212 may be provided to the gate terminal of a MOSFET in the form of the signal relay 230 to conduct current through the drain and source terminals of the MOSFET.

Figure 3A:
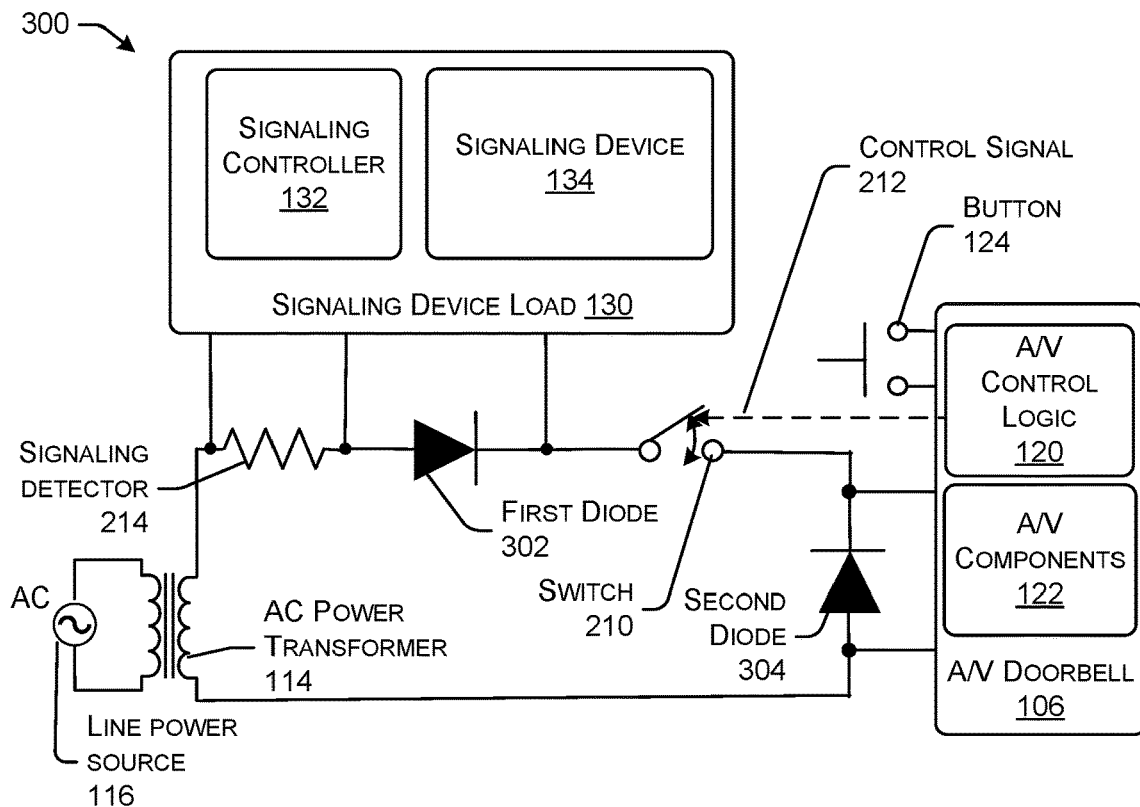
FIGS. 3A and 3B are schematic diagrams of an A/V doorbell circuit with signaling between the A/V doorbell and the signaling device load and rectification of the AC power source, as well as power waveforms supplied to the A/V doorbell and the signaling device load, according to various aspects of the present disclosure.
Figure 3B:
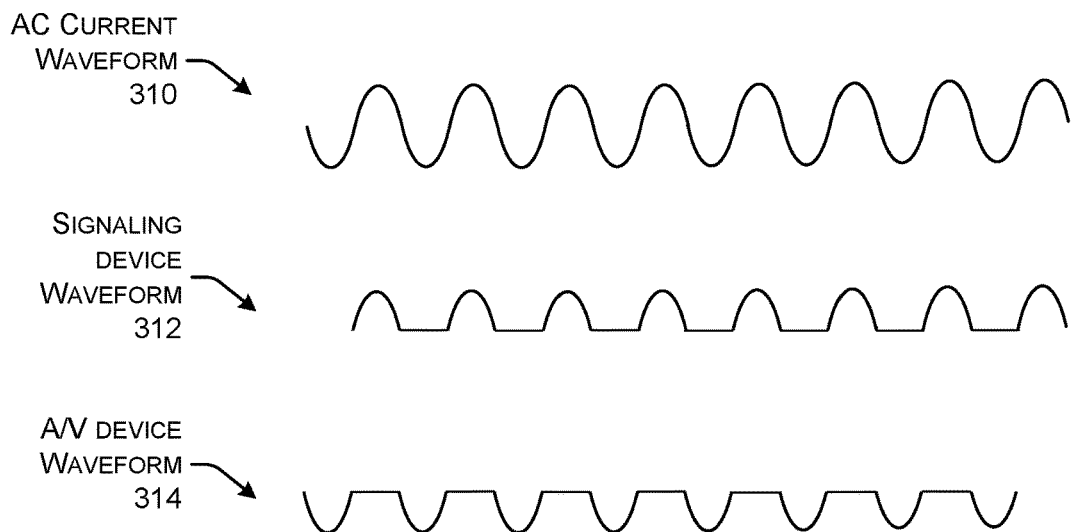

FIGS. 3A and 3B are schematic diagrams of an A/V doorbell circuit 300 with signaling between the A/V doorbell 106 and the signaling device load 130 and rectification of the AC waveform, as well as power waveforms supplied to the A/V doorbell 106 and the signaling device 130, according to various aspects of the present disclosure. Similar to the doorbell circuits 200 and 220 of FIGS. 2A and 2B, the doorbell circuit 300 may include a signal relay 210, which is controlled by a control signal 212 and a signaling detector 214. The operations of these components 210, 212, 214 are substantially similar to that described previously, and in the interest of brevity will not be discussed here further.

The doorbell circuit 300 may include a first diode 302 that is connected in parallel with the signaling device load 130, and a second diode 304 that is connected in parallel with the A/V doorbell 106. Although diodes 302, 304 are discussed herein, any suitable directional electronic devices may be used in place of the diodes 302, 304, such as Zener diodes, or the like. The first diode 302 may rectify the AC waveform of the doorbell circuit 300 to provide a positive phase of the AC waveform to the signaling device load 130. Similarly, the second diode 304 may rectify the AC waveform of the doorbell circuit 300 to provide a negative phase of the AC waveform. In some alternative embodiments, the signal relay 210 may be connected in parallel with the second diode 304, rather than in series with the second diode 304.

FIG. 3B illustrates schematic representations of the various waveforms in the doorbell circuit 300. The AC current waveform 310 of the doorbell circuit 300 may be a sinusoidal signal, as shown. The portion of the AC current waveform 310 that is provided to the signaling device load 130 is shown as signaling device waveform 312, and represents the positive phase of the AC current waveform 310. The portion of the AC current waveform 310 that is provided to the A/V doorbell 106 is shown as A/V doorbell waveform 314, and represents the negative phase of the AC current waveform 310. In some cases, smoothing capacitors and/or other electronic components that provide reactive impedance may be provided to smooth the waveforms 312, 314 to generate DC power and/or near DC power, such as a rippled DC power source.

Figure 4A:
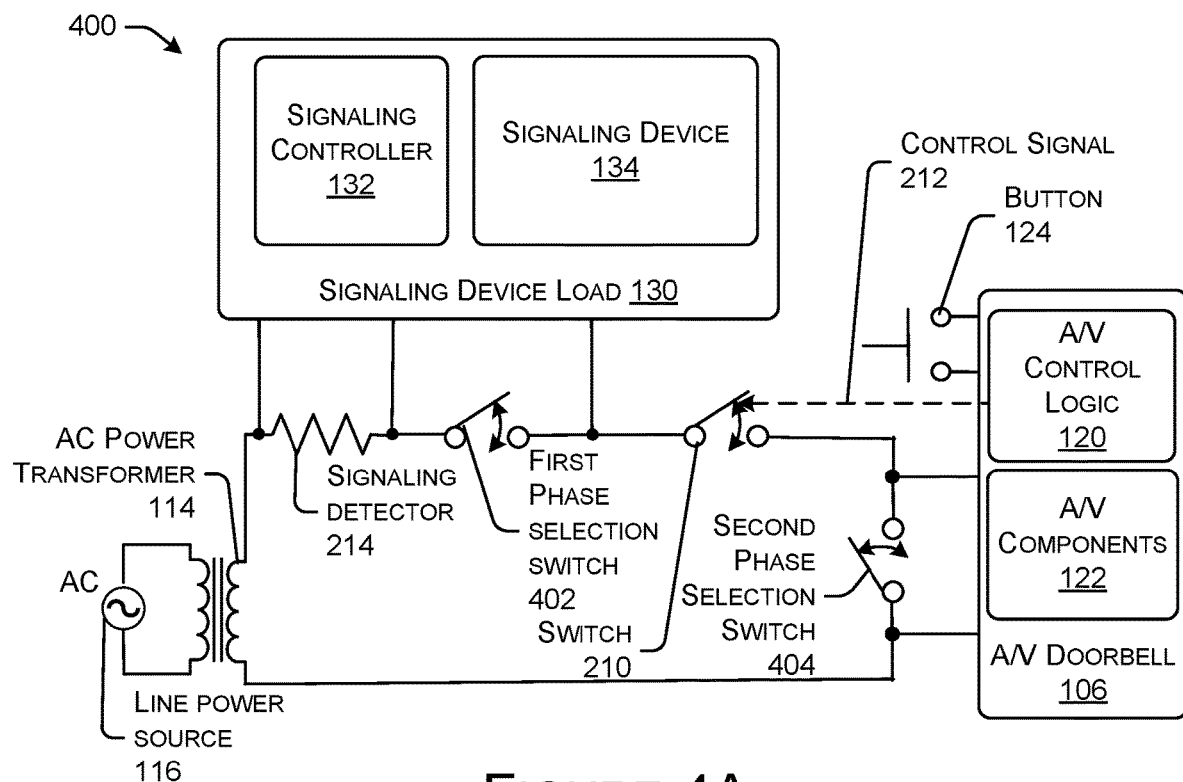
FIGS. 4A and 4B are schematic diagrams of an A/V doorbell circuit providing selected portions of an AC waveform to the A/V doorbell and the signaling device load, as well as power waveforms supplied to the A/V doorbell and the signaling device load, according to various aspects of the present disclosure.
Figure 4B:
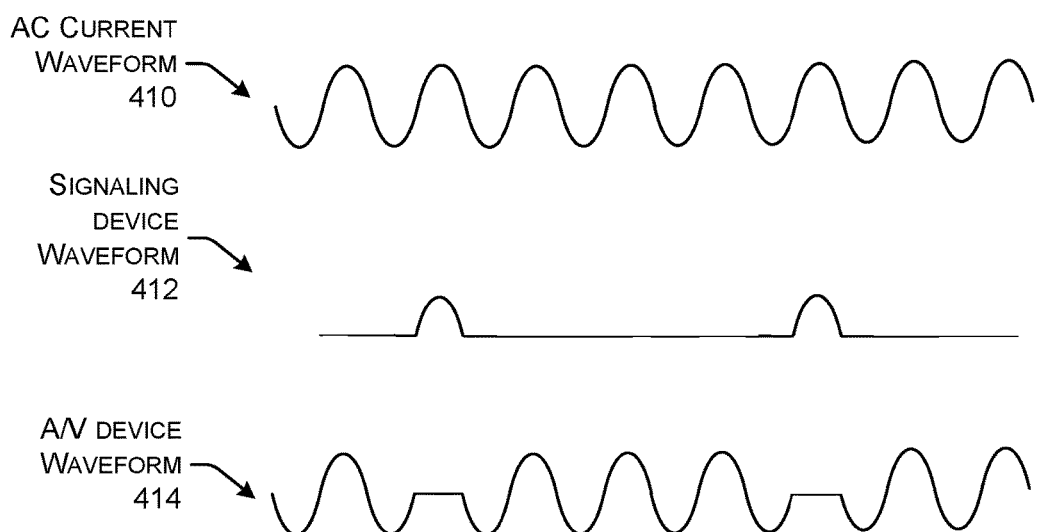

FIGS. 4A and 4B are schematic diagrams of a doorbell circuit 400 providing selected portions of an AC waveform to the A/V doorbell 106 and the signaling device load 130, as well as power waveforms supplied to the A/V doorbell 106 and the signaling device load 130, according to various aspects of the present disclosure. The doorbell circuit 400 may include mechanisms for signaling between the A/V doorbell 106 and the signaling device load 130 enabled by the signal relay 210 and/or the signaling detector 214, as discussed herein. The doorbell circuit 400 may include a first phase selection switch 402 that may be controlled to provide portions of the AC waveform of the doorbell circuit 400 to power the signaling device load 130. Similarly, the doorbell circuit 400 may also include a second phase selection switch 404 that may be controlled to provide other portions, different from the portions provided to power the signaling device load 130, of the AC waveform to power the signaling device load 130. In example embodiments, the portions of the AC waveform provided to the signaling device load 130 may be out of phase (e.g., 180-degrees out of phase) with the portions of the AC waveform to power the A/V doorbell 106. Thus, the first phase selection switch 402 may be actuated out of phase (e.g., 180-degrees out of phase relative to each other) with the second phase selection switch 404.

The phase selection switches 402, 404 may comprise, or include, any type of electrical-based switch, mechanical-based switch, and/or electromechanical-based switch. For instance, the phase selection switches 402, 404 may include, and/or be driven by, a triac (Triode for Alternating Current) device, a transistor device (e.g., a BJT (Bipolar Junction Transistor), a MOSFET (Metal-Oxide Semiconductor Field-Effect Transistor), etc.), a solenoid, and/or any other type of switching mechanism or device. Each phase selection switch 402, 404 may receive a control signal to actuate and/or modulate the corresponding phase selection switch 402, 404. For example, if the phase selection switch 402, 404 is a MOSFET, the gate of the MOSFET may be provided with a control signal that selectively controls the conduction of current through the drain and source nodes of the MOSFET.

When the signaling device load 130 is to receive power from the AC waveform, the phase selection switch 402 may be controlled, such as by the signaling controller 132, to be open. When the phase selection switch 402 is open, power from the AC waveform may be provided to the signaling device load 130. When the signaling device load 130 is not to receive power from the AC waveform, the phase selection switch 402 may be controlled, such as by the signaling controller 132 to be closed. By closing the phase selection switch 402, the flow of current may bypass the signaling device load 130. Thus, modulation of the phase selection switch 402 determines which portions of the AC waveform are used to power the signaling device load 130 and which other portions bypass the signaling device load 130.

When the A/V doorbell 106 is to receive power from the AC waveform, the phase selection switch 404 may be controlled, such as by the A/V control logic 120, to be open. When the phase selection switch 404 is open, power from the AC waveform may be provided to the A/V doorbell 106. When the A/V doorbell 106 is not to receive power from the AC waveform, the phase selection switch 404 may be controlled, such as by the A/V control logic 120 to be closed. By closing the phase selection switch 404, the flow of current may bypass the A/V doorbell 106. Thus, modulation of the phase selection switch 404 determines which portions of the AC waveform are used to power the A/V doorbell 106 and which other portions bypass the A/V doorbell 106.

FIG. 4B illustrates schematic representations of the various waveforms in the doorbell circuit 400. The AC current waveform 410 of the doorbell circuit 400 may be a sinusoidal signal, as shown. The portion of the AC current waveform 410 that is provided to the signaling device load 130 is shown as signaling device waveform 412, and represents one-fourth of the positive phase of the AC current waveform 410. In other words, every fourth positive portion of the AC current waveform 410 is used to power the signaling device load 130. Additionally, the portion of the AC current waveform 410 that is provided to the A/V doorbell 106 is shown as A/V doorbell waveform 414, and represents the portion of the AC current waveform 410 that is not used to power the signaling device load 130. In other words, all of the AC current waveform 410, except for every fourth positive phase, may be used to power the A/V doorbell 106. The waveforms 410, 412, 414 are only examples, and the waveform 410 may be divided between the A/V doorbell 106 and the signaling device load 130 in any suitable proportion. For example, the proportion of current and/or power provided to the A/V doorbell relative to the signaling device load 130 may be 1:9, 3:7, 15:85, 5:5, 25:75, 9:1, or indeed any suitable proportion. In some cases, smoothing capacitors and/or other electronic components that provide reactive impedance may be provided to smooth the waveforms 412, 414 to generate DC power and/or near DC power, such as a rippled DC power source.

Figure 5A:
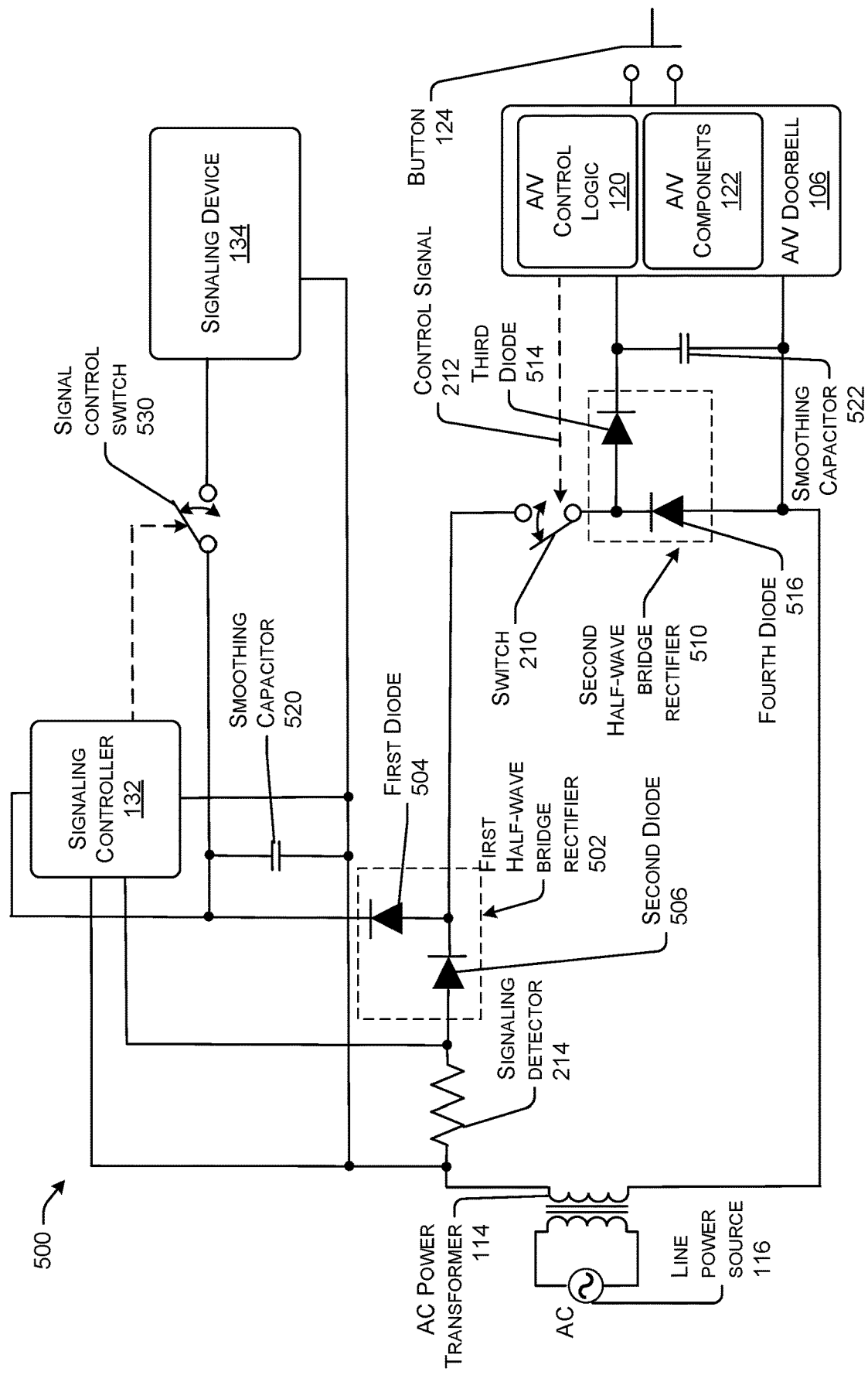
FIGS. 5A, 5B, and 5C are schematic diagrams of an A/V doorbell circuit with half-wave bridge rectifiers, as well as power waveforms supplied to the A/V doorbell and the signaling device load, according to various aspects of the present disclosure.
Figure 5B:
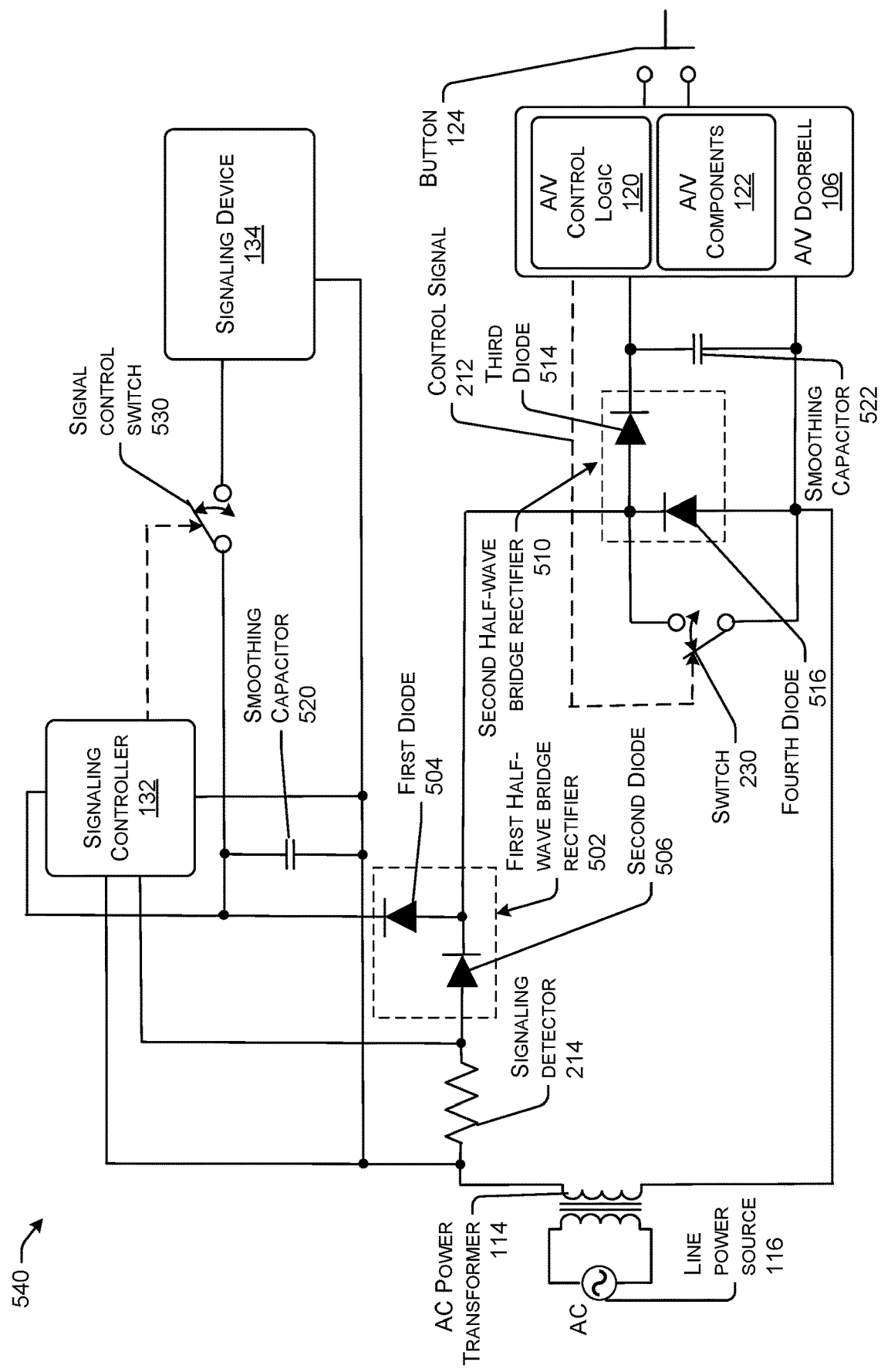
Figure 5C:
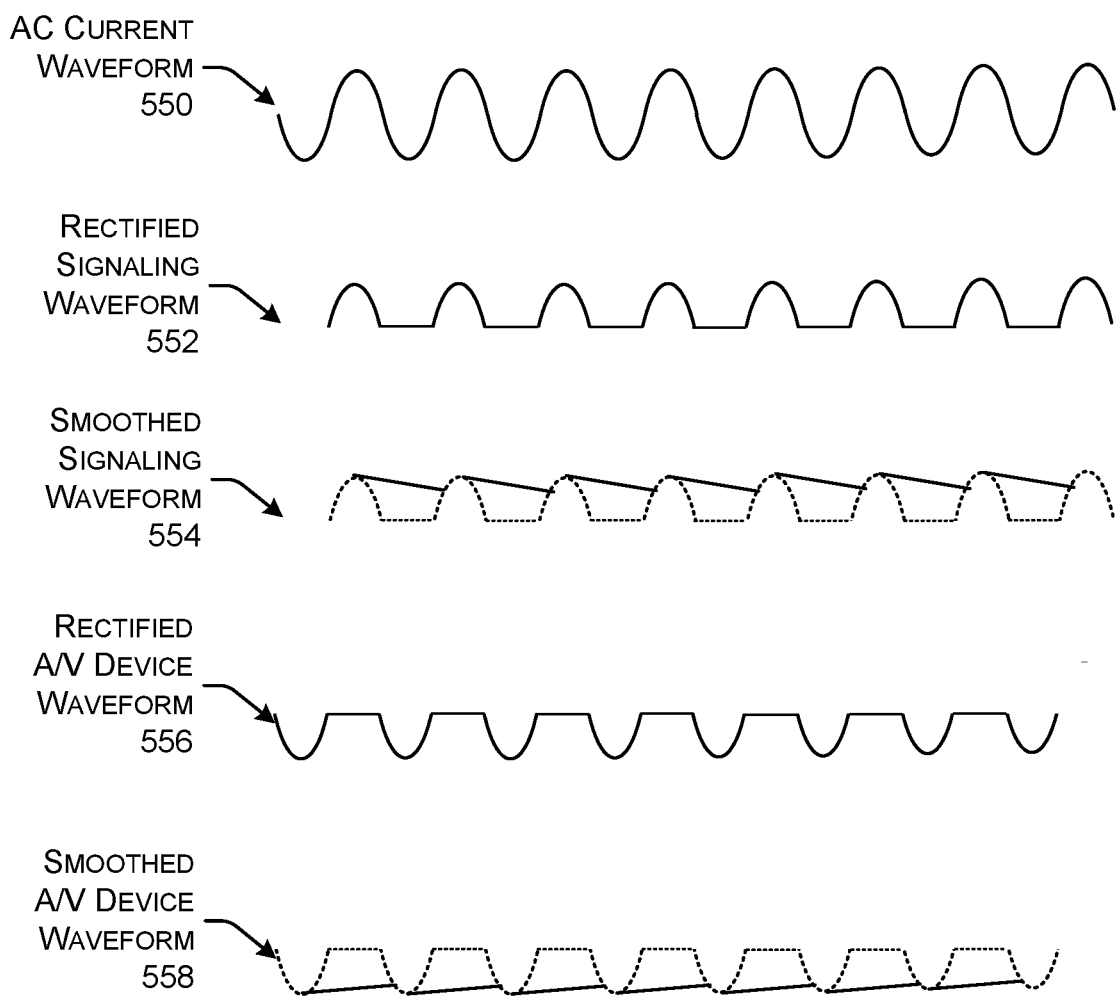

FIGS. 5A, 5B, and 5C are schematic diagrams of an A/V doorbell circuit 500, 540 with half-wave bridge rectifiers 502, 510, as well as power waveforms supplied to the A/V doorbell 106 and the signaling device load 130, according to various aspects of the present disclosure. Referring to FIG. 5A, the doorbell circuit 500 may include mechanisms for signaling between the A/V doorbell 106 and the signaling device load 130 enabled by the signal relay 210 and/or the signaling detector 214, as discussed herein. The doorbell circuit 500 may further include a first half-wave bridge rectifier 502 to provide a rectified portion of the AC waveform of the doorbell circuit 500 to the signaling controller 132 and/or the signaling device 134. The rectified portion of the AC waveform may, in some embodiments, be the positive phase of the AC waveform.

The first half-wave bridge rectifier 502 may include a first diode 504 and a second diode 506. The AC waveform of the doorbell circuit 500 may be received by the second diode 506, and a rectified output to power the signaling controller 132 and/or the signaling device 134 may be provided by the first diode 504. The cathode, or output, of the second diode 506 may be electrically connected to the anode, or input, of the first diode 504. When a negative portion of the AC waveform of the doorbell circuit 500 is present at the anode of the second diode 506, the second diode 506 may be reverse biased and block any current from passing therethrough. However, when a positive portion of the AC waveform of the doorbell circuit 500 is present at the anode of the second diode 506, the second diode 506 may be forward biased and pass current therethrough. Similarly, the first diode 504 may be forward biased and allow the current to pass therethrough. In this way, the first half-bridge rectifier 502 may provide a rectifying characteristic, where the positive phase of the AC waveform is passed therethrough and the negative phase is blocked.

The doorbell circuit 500 may similarly include a second half-wave bridge rectifier 510 to provide a rectified portion of the AC waveform of doorbell circuit 500 to the A/V doorbell 106. In this case, the rectified portion of the AC waveform may be the negative phase of the AC waveform. The polarity of the phases provided to the A/V doorbell 106 and the signaling device load 130, as depicted herein, is just an example. In other example embodiments, the positive phase of the AC waveform may be used to power the A/V doorbell 106, while the negative phase of the AC waveform may be used to power the signaling device load 130. The second half-wave bridge rectifier 510 may include a third diode 514 and a fourth diode 516. The AC waveform of the doorbell circuit 500 may be received by the fourth diode 516, and a rectified output to power the A/V doorbell 106 may be provided by the third diode 514.

The cathode, or output, of the fourth diode 516 may be electrically connected to the anode, or input, of the third diode 514. When a positive portion of the AC waveform of the doorbell circuit 500 is present at the anode of the fourth diode 516, the fourth diode 516 may be reverse biased and block any current from passing therethrough. However, when a negative portion of the AC waveform of the doorbell circuit 500, as provided from the AC power transformer 114, is present at the anode of the fourth diode 516, the fourth diode 516 may be forward biased and pass current therethrough. Similarly, the third diode 514 may be forward biased and allow the current to pass therethrough. In this way, the second half-bridge rectifier 510 may provide a rectifying characteristic, where the negative phase of the AC waveform is passed therethrough and the positive phase is blocked. Although the circuit 500 is depicted with half-wave bridge rectifiers 502, 510, any suitable rectifying electrical element may be used to provide one or the other phase of the AC waveform to the signaling device load 130 and the A/V deice 106.

With further reference to FIG. 5A, the doorbell circuit 500 may further include a smoothing capacitor 520 electrically connected at the cathode, or output, of the first diode 504. This smoothing capacitor 520 may smooth the output of the first half-wave bridge rectifier 502 to produce a DC or near DC (e.g., DC with ripples and/or noise) power supply for the signaling device load 130. The capacitance value of the smoothing capacitor 520 may be selected to provide a sufficient level of smoothing. For example, the capacitance value of the smoothing capacitor may be selected to be a value where the product of the capacitance and the resistance across the smoothing capacitor (e.g., RC) is on the order of the period of the AC waveform (e.g., 16.7 ms for a 60 Hz AC waveform, 20 ms for a 50 Hz waveform, etc.). The doorbell circuit 500 may further include a smoothing capacitor 522 electrically connected at the cathode, or output, of the third diode 514. This smoothing capacitor 522 may smooth the output of the second rectifier 510 to produce a DC or near DC (e.g., DC with ripples and/or noise) power supply for the A/V doorbell 106. The capacitance value of the smoothing capacitor 520 may be selected to provide a sufficient level of smoothing, such as in the manner described with respect to the smoothing capacitor 520. For the purposes of smoothing a rectified signal, other reactive impedances (e.g., an inductor) may be used in addition to or instead of the smoothing capacitors 520, 522.

The doorbell circuit 500 may further include a signal control switch 530. This signal control switch may be controlled by the signaling controller 132 to energize the signaling device 134. When the signaling controller 132 is to activate the signaling device 134, the signaling controller 132 may cause the signal control switch 530 to close so that the signaling device 134 draws power from the output of the first half-wave bridge rectifier 502. The signal control switch 530 may comprise, or include, any type of electrical-based switch, mechanical-based switch, and/or electromechanical-based switch. For instance, the signal control switch 530 may include, and/or be driven by, a triac (Triode for Alternating Current) device, a transistor device (e.g., a BJT (Bipolar Junction Transistor), a MOSFET (Metal-Oxide Semiconductor Field-Effect Transistor), etc.), a solenoid, and/or any other type of switching mechanism or device. The signal control switch 530 may receive a control signal, such as from the signaling controller 132, to actuate and/or modulate the signal control switch 530. For example, if the signal control switch 530 is a MOSFET, the gate of the MOSFET may be provided with the control signal, from the signaling controller 132, that selectively controls the conduction of current through the drain and source nodes of the MOSFET.

In the doorbell circuit 500, the signal relay 210 for the A/V control logic 120 to signal to the signaling controller 132 that the doorbell button 124 has been pressed is provided in series with the fourth diode 516. In other words, the signal relay 210 is connected between a node defined by the connection of the fourth diode 516 and the third diode 514 and a node defined by the connection of the second diode 506 with the first diode 504. The doorbell circuit 540 of FIG. 5B may be similar to the doorbell circuit 500 of FIG. 5A, except that the signal relay 230 is connected in parallel with the fourth diode 516. In this doorbell circuit 540, power delivery to the A/V doorbell 106 may remain uninterrupted while the signal relay 230 is closed to indicate to the signaling controller 132 that the doorbell button 124 has been pressed.

FIG. 5C illustrates schematic representations of the various waveforms in the doorbell circuit 500. The AC current waveform 550 of the doorbell circuit 500 may be a sinusoidal signal, as shown. A rectified signaling waveform 552 may be provided by the first half-wave bridge rectifier 502 to power the signaling device load 130. The rectified signaling waveform 552 may be the positive phase of the AC current waveform 550. When the rectified signaling waveform is applied to the smoothing capacitor 520, a smoothed signaling waveform 554 may be generated. Similarly, a rectified A/V doorbell waveform 556 may be provided by the second half-wave bridge rectifier 510 to power the A/V doorbell 106. The rectified A/V doorbell waveform 556 may be the negative phase of the AC current waveform 550. When the rectified A/V doorbell waveform is applied the smoothing capacitor 522, a smoothed A/V doorbell waveform 558 may be generated.

Figure 6A:
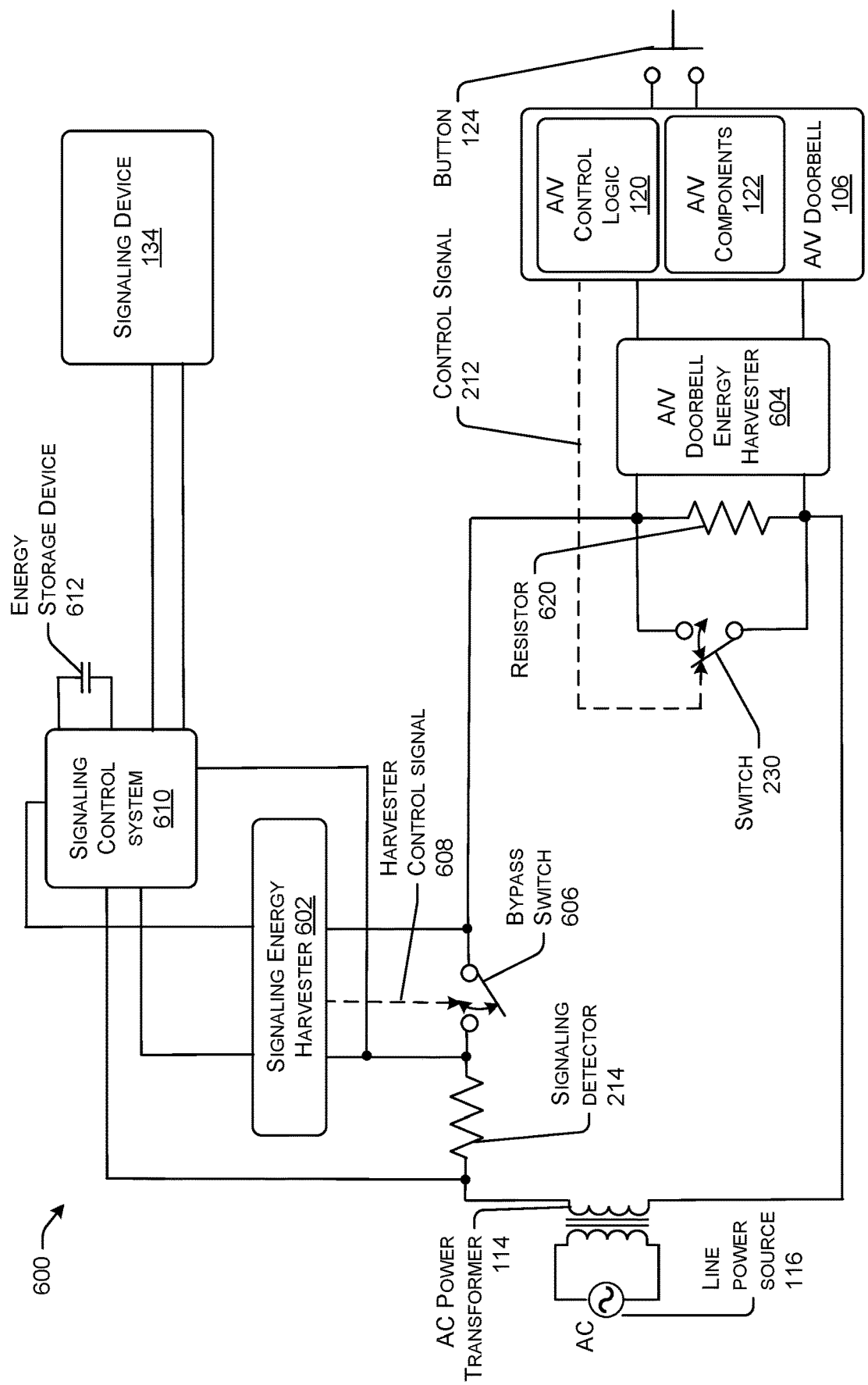
FIGS. 6A and 6B are schematic diagrams of an A/V doorbell circuit with energy harvesting, according to various aspects of the present disclosure.
Figure 6B:
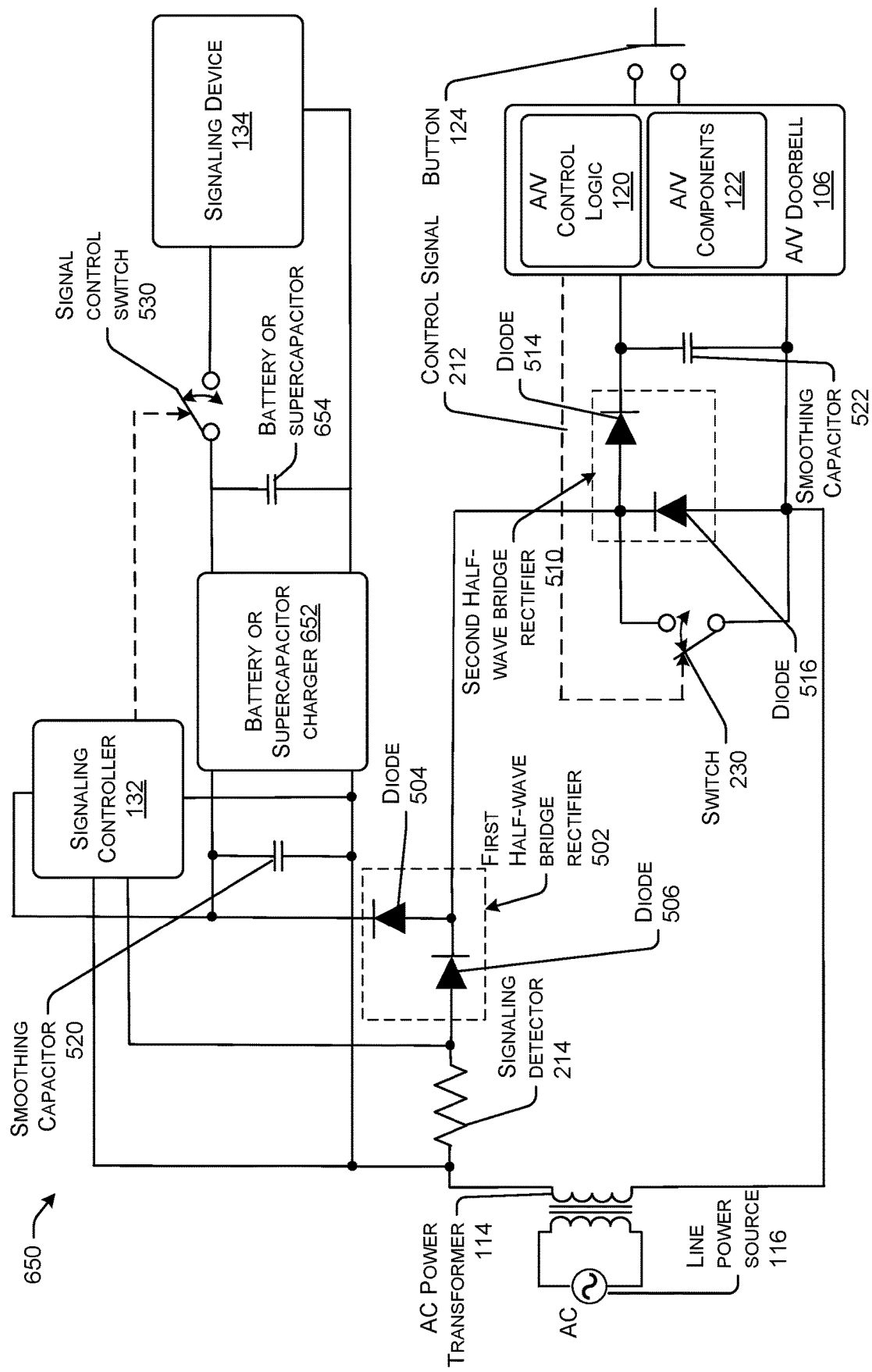

FIGS. 6A and 6B are schematic diagrams of an A/V doorbell circuit 600, 650 with energy harvesting, according to various aspects of the present disclosure. With reference to FIG. 6A, the doorbell circuit 600 may include mechanisms for signaling between the A/V doorbell 106 and a signaling control system 610 enabled by the signal relay 210 and/or the signaling detector 214, as discussed herein. The signaling control system 610 may include the components and functionality of the signaling controller 132 with additional functionality of charging and discharging an energy storage device 612. The doorbell circuit 600 may further include a signaling energy harvester 602 to provide power from a portion of the AC waveform of the doorbell circuit 600 to the signaling control system 610. The doorbell circuit 600 may also include an A/V doorbell energy harvester 604 to provide power to the A/V doorbell 106.

The signaling energy harvester 602 may be configured to collect energy from portions of the AC waveform of the doorbell circuit 600, such as by opening a bypass switch 606. Thus, the signaling energy harvester 602 may receive energy from the doorbell circuit 600 when the bypass switch is open, thereby directing current to the signaling energy harvester 602. When the bypass switch 606 is closed, the AC waveform current may bypass the signaling energy harvester 602 preventing the signaling energy harvester 602 from receiving power while the bypass switch 606 is closed. The signaling energy harvester 602 may generate a harvester control signal 608 to actuate and/or modulate the bypass switch 606 to selectively harvest power from the doorbell circuit 600. In some cases, the signaling energy harvester 602 may control the bypass switch 606 such that it harvests energy with a unidirectional current and/or rectified current from the AC waveform of the doorbell circuit 600. For example, energy may be harvested from a positive phase of the AC waveform by the signaling energy harvester 602. Alternatively, the signaling energy harvester 602 may harvest energy from a negative phase of the AC waveform of the current flowing through the doorbell circuit 600.

The bypass switch 606 may comprise, or include, any type of electrical-based switch, mechanical-based switch, and/or electromechanical-based switch. For instance, the bypass switch 606 may include, and/or be driven by, a triac (Triode for Alternating Current) device, a transistor device (e.g., a BJT (Bipolar Junction Transistor), a MOSFET (Metal-Oxide Semiconductor Field-Effect Transistor), etc.), a solenoid, and/or any other type of switching mechanism or device. The bypass switch 606 may receive the harvester control signal 608, such as from the signaling energy harvester 602, to actuate and/or modulate the bypass switch 606. For example, if the bypass switch 606 is a MOSFET, the gate of the MOSFET may be provided with the harvester control signal 608, from the signaling energy harvester 602, that selectively controls the conduction of current through the drain and source nodes of the MOSFET.

The signaling energy harvester 602 may be configured to not only provide power to the signaling control system 610, but to also charge up the energy storage device 612, which in some embodiments may comprise a battery or a supercapacitor. When the signaling device 134 is to be energized, the signaling control system 610 may discharge the energy stored in the energy storage device 612 into the signaling device 134, in a manner similar to that discussed for the circuit 500 of FIG. 5A.

The energy storage device 612 may comprise one or more supercapacitors, which may also be referred to as double layer capacitors. In particular implementations, the one or more supercapacitors may include two electrodes (e.g., an anode and a cathode) that are separated by an electrolyte and a separator layer. Applying a voltage to the electrodes may cause a double layer of charged particles to form near the surface of each electrode. For example, a layer of positively charged particles of a cathode may be disposed at or near the surface of the cathode, while a layer of negatively charged particles in the electrolyte may also be disposed near the surface of the cathode. Conversely, a layer of negatively charged particles of an anode may be disposed at or near the surface of the anode, while a layer of positively charged particles in the electrolyte may be disposed near the surface of the anode. The layers of positively charged particles and the layers of negatively charged particles can be separated by a relatively thin layer of electrolyte molecules. When a voltage is applied, an electric field may develop in the layer of electrolyte molecules between the positively charged particles and the negatively charged particles. The voltage produced across the electrodes of supercapacitors corresponds to the voltage applied to charge the supercapacitors. In example embodiments, high dielectric constant ("high-k") dielectrics supercapacitors (e.g., hafnium oxide, zirconium oxide, strontium titanate, barium titanate, etc.) may be used as the energy storage device 612. The energy storage device 612 may comprise batteries including electrochemical cells that produce energy via chemical reactions. The chemical reactions take place when ions of an electrolyte react with ions from the electrodes. Any suitable type of battery may be used, including for example, lead-acid batteries, lithium ion batteries, dry cells, wet cells, or the like.

The A/V energy harvester 604 may harvest energy from current that passes through a resistor 620 connected in parallel with the A/V energy harvester 604. In example embodiments, the A/V doorbell energy harvester 604 may harvest energy from a part of the AC waveform current flowing through the doorbell circuit 600 that is not used by the signaling energy harvester 602 for harvesting energy. Alternatively, the A/V energy harvester 604 may control a bypass switch (not shown) similar to the bypass switch 606 to collect energy from the doorbell circuit 600. As another alternative, the A/V energy harvester 604 may include one or more diodes, a half-wave bridge rectifier, a full-wave bridge rectifier, other rectifying devices, or the like. FIG. 6A depicts the switch 230 connected in parallel with the A/V doorbell energy harvester 604, however alternatively the switch may be connected in series with the A/V doorbell energy harvester 604.

Referring now to FIG. 6B, the circuit 650 may include a first half-wave bridge rectifier that provides a rectified portion (e.g., the positive phase) of the AC waveform to the signaling controller 132 and a battery or supercapacitor charger 652. The battery or supercapacitor charger 652 may charge a battery or supercapacitor 654 using the power received from the half-wave bridge rectifier 502, as smoothed by the smoothing capacitor 520. When the signaling device 134 is to be activated, the signaling controller 132 may cause the signal control switch 530 to close to discharge the energy stored in the battery or supercapacitor 654 into the signaling device 134.

Figure 7:
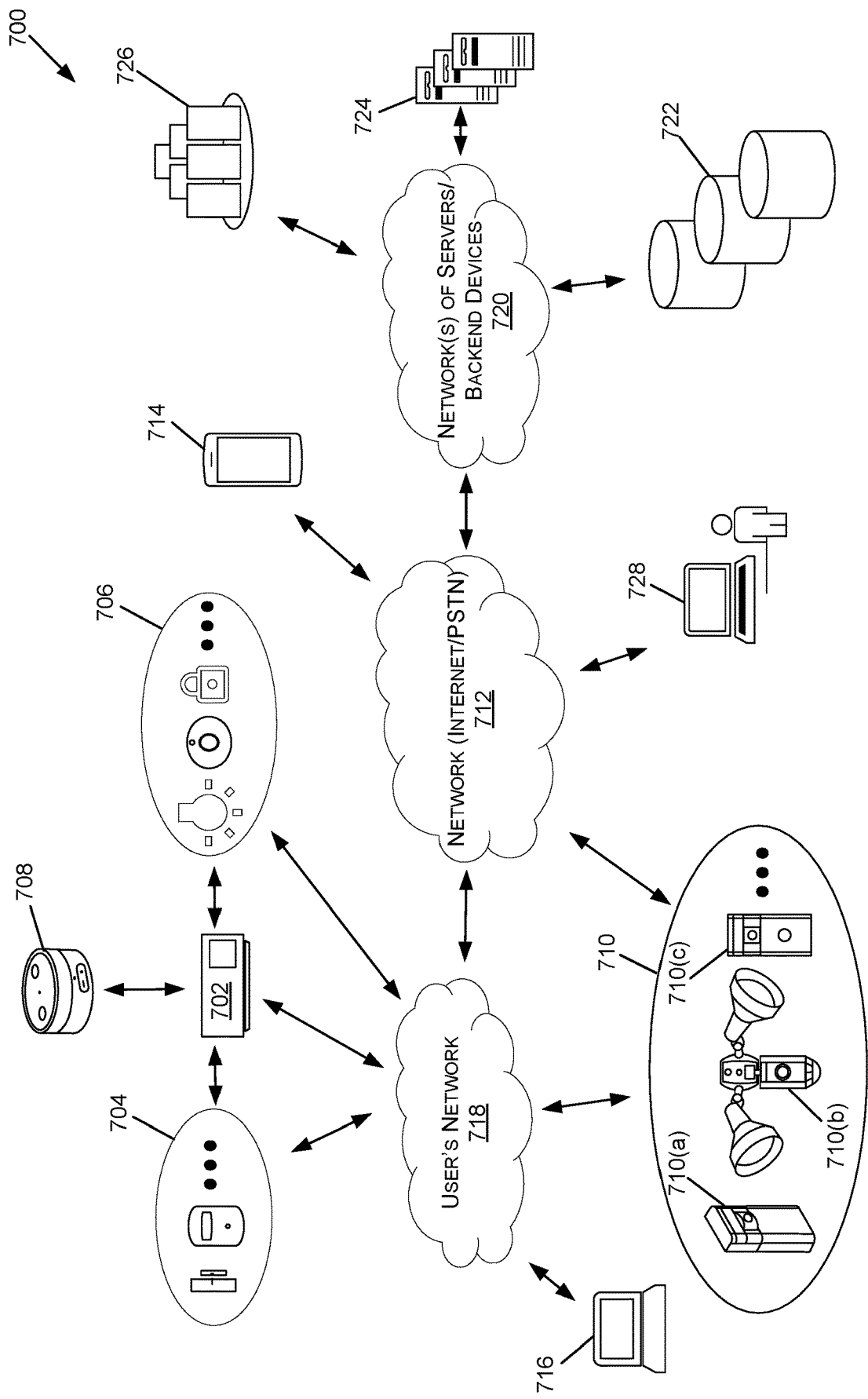
FIG. 7 is a functional block diagram illustrating a system for communicating in a network, according to various aspects of the present disclosure.

FIG. 7 is a schematic diagram illustrating a system 700 for communicating in a network, according to various aspects of the present disclosure. Home automation, or smart home, is building automation for the home. Home automation enable users (e.g., home owners and authorized persons) to control and/or automate various devices and/or systems, such as lighting, heating (e.g., smart thermostats), ventilation, home entertainment, air conditioning (HVAC), blinds/shades, security devices (e.g., contact sensors, smoke/CO detectors, motion sensors, etc.), washers/dryers, ovens, refrigerators/freezers, and/or other network connected devices suitable for use in the home. In various implementations, Wi-Fi is used for remote monitoring and control of such devices and/or systems. Smart home devices (e.g., hub devices 702, sensors 704, automation devices 706, a virtual assistant (VA) device 708, Audio/Video (A/V) recording and communication devices 710, etc.), when remotely monitored and controlled via a network (Internet/a public switched telephone network (PSTN)) 712, may be considered to be components of the "Internet of Things." Smart home systems may include switches and/or sensors (e.g., the sensors 704) connected to a central hub such as the smart-home hub device 702 and/or the VA device 708 (the hub device 702 and/or the VA device 708 may alternatively be referred to as a gateway, a controller, a home-automation hub, or an intelligent personal assistance device) from which the system may be controlled through various user interfaces, such as voice commands and/or a touchscreen. Various examples, of user interfaces may include any or all of a wall-mounted terminal (e.g., a keypad, a touchscreen, etc.), software installed on the client devices 714, 716 (e.g., a mobile application), a tablet computer, or a web interface. Furthermore, these user interfaces are often but not always supported by Internet cloud services. In one example, the Internet cloud services are responsible for obtaining user input via the user interfaces (e.g., a user interface of the hub device 702 and/or the VA device 708) and causing the smart home devices (e.g., the sensors 704, the automation devices 706, etc.) to perform an operation in response to the user input.

The hub device 702, the VA device 708, the sensors 704, the automation devices 706, the A/V recording and communication devices 710, and/or client devices 714, 716 may use one or more wired and/or wireless communication protocols to communicate, including, for example and without limitation, Wi-Fi (e.g., the user's network 718), X10, Ethernet, RS-485, 6LoWPAN, Bluetooth LE (BLE), ZigBee, Z-Wave, and/or a low power wide-area networks (LPWAN), such as a chirp spread spectrum (CSS) modulation technology network (e.g., LoRaWAN), an Ultra Narrow Band modulation technology network (e.g., Sigfox, Telensa, NB-IoT, etc.), RingNet, and/or the like.

The user's network 718 may be, for example, a wired and/or wireless network. If the user's network 718 is wireless, or includes a wireless component, the user's network 718 may be a Wi-Fi network compatible with the IEEE 802.11 standard and/or other wireless communication standard(s). Furthermore, the user's network 718 may be connected to other networks such as the network 712, which may comprise, for example, the Internet and/or PSTN.

The system 700 may include one or more A/V recording and communication devices 710 (alternatively referred to herein as "A/V devices 710" or "A/V device 710") (which may represent, and/or be similar to, the A/V device 106 or A/V doorbell 106 of FIG. 1). The A/V devices 710 may include security cameras 710(a), light cameras 710(b) (e.g., floodlight cameras, spotlight cameras, etc.), video doorbells 710(c) (e.g., wall powered and/or battery powered video doorbells), and/or other devices capable of recording audio data and/or image data. The A/V devices 710 may be configured to access a user's network 718 to connect to a network (Internet/PSTN) 712 and/or may be configured to access a cellular network to connect to the network (Internet/PSTN) 712. The components and functionality of the A/V devices 710 are described in more detail below with respect to FIG. 8.

The system 700 may further include a smart-home hub device 702 (which may alternatively be referred to herein as the "hub device 702") connected to the user's network 718 and/or the network (Internet/PSTN) 712. The smart-home hub device 702 (also known as a home automation hub, gateway device, or network device), may comprise any device that facilitates communication with and control of the sensors 704, automation devices 706, the VA device 708, and/or the one or more A/V devices 710. For example, the smart-home hub device 702 may be a component of a security system and/or a home automation system installed at a location (e.g., a property, a premise, a home, a business, etc.). In some implementations, the A/V devices 710, the VA device 708, the sensors 704, and/or the automation devices 706 communicate with the smart-home hub device 702 directly and/or indirectly using one or more wireless and/or wired communication protocols (e.g., BLE, Zigbee, Z-Wave, etc.), the user's network 718 (e.g., Wi-Fi, Ethernet, etc.), and/or the network (Internet/PSTN) 712. In some of the present implementations, the A/V devices 710, the VA device 708, the sensors 704, and/or the automation devices 706 may, in addition to or in lieu of communicating with the smart-home hub device 702, communicate with the client devices 714, 716, the VA device 708, and/or one or more of components of the network of servers/backend devices 720 directly and/or indirectly via the user's network 718 and/or the network (Internet/PSTN) 712.

As illustrated in FIG. 7, the system 700 includes the VA device 708. The VA device 708 may be connected to the user's network 718 and/or the network (Internet/PSTN) 712. The VA device 708 may include an intelligent personal assistant, such as, without limitation, Amazon Alexa® and/or Apple Siri®. For example, the VA device 708 may be configured to receive voice commands, process the voice commands to determine one or more actions and/or responses (e.g., transmit the voice commands to the one or more components of the network of servers/backend devices 720 for processing), and perform the one or more actions and/or responses, such as to activate and/or change the status of one or more of the sensors 704, automation devices 706, or A/V devices 710. In some implementations, the VA device 708 is configured to process user inputs (e.g., voice commands) without transmitting information to the network of servers/backend devices 720 for processing. The VA device 708 may include at least one speaker (e.g., for playing music, for outputting the audio data generated by the A/V devices 710, for outputting the voice of a digital assistant, etc.), at least one a microphone (e.g., for receiving commands, for recording audio data, etc.), and a display (e.g., for displaying a user interface, for displaying the image data generated by the A/V devices 710, etc.). In various implementations, the VA device 708 may include an array of speakers that are able to produce beams of sound. Although illustrated as a separate component in FIG. 2, in some implementations the VA device 708 may not be a separate component from the hub device 702. In such implementations, the hub device 702 may include the functionality of the VA device 708 or the VA device 708 may include the functionality of the hub device 702.

The one or more sensors 704 may include, for example, at least one of a door sensor, a window sensor, a contact sensor, a tilt sensor, a temperature sensor, a carbon monoxide sensor, a smoke detector, a light sensor, a glass break sensor, a freeze sensor, a flood sensor, a moisture sensor, a motion sensor, and/or other sensors that may provide the user/owner of the security system a notification of a security event at his or her property.

In various implementations, a contact sensor may include any component configured to inform (e.g., via a signal) the security system whether an object (e.g., a door or a window) is open or closed. A contact sensor may include first and second components: a first component installed on the object itself (e.g., the door or the window); the second component installed next to the object (e.g., on the door jamb). The first and second components of the contact sensor, however, need not actually be in physical contact with one another in order to be in the closed (not faulted) state. For example, at least one of the first and second components may include a magnet, and the contact sensor may rely on the Hall effect for determining a proximity of the first and second pieces to one another. When the door, window, or other object, is opened, and the first and second components move apart from one another, the contact sensor may transmit an open signal to the security system (e.g., to the hub device 702). A similar process may be performed when the object is closed. In some examples, a signal transmitted by the security system by the contact sensor during opening and/or closing may be the same signal, and the hub device 702 may interpret the signal based on the known state of the object (e.g., when a door is closed, and the signal is received, the hub device 702 may update the status of the door to open).

The one or more automation devices 706 may include, for example, at least one of an outdoor lighting system, an indoor lighting system, and indoor/outdoor lighting system, a temperature control system (e.g., a thermostat), a shade/blind control system, a locking control system (e.g., door lock, window lock, etc.), a home entertainment automation system (e.g., TV control, sound system control, etc.), an irrigation control system, a wireless signal range extender (e.g., a Wi-Fi range extender, a Z-Wave range extender, etc.), a barrier control device (e.g., an automated door hinge), a smart doormat, and/or other automation devices.

As described herein, in some of the present implementations, some or all of the client devices 714, 716, the A/V device(s) 710, the smart-home hub device 702, the VA device 708, the sensors 704, and the automation devices 706 may be referred to as a security system and/or a home-automation system. The security system and/or home-automation system may be installed at location, such as a property, home, business, or premises for the purpose of securing and/or automating all or a portion of the location.

The system 700 may further include one or more client devices 714, 716. The client devices 714, 716 may communicate with and/or be associated with (e.g., capable of access to and control of) the A/V devices 710, a smart-home hub device 702, the VA device 708, sensors 704, and/or automation devices 706. In various implementations, the client devices 714, 716 communicate with other devices using one or more wireless and/or wired communication protocols, the user's network, and/or the network (Internet/PSTN) 712, as described herein. The client devices 714, 716 may comprise, for example, a mobile device such as a smartphone or a personal digital assistant (PDA), or a computing device such as a tablet computer, a laptop computer, a desktop computer, etc. In some implementations, the client devices 714, 716 includes a connected device, such as a smart watch, Bluetooth headphones, another wearable device, or the like. In such implementations, the client devices 714, 716 may include a combination of the smartphone or other device and a connected device (e.g., a wearable device), such that alerts, data, and/or information received by the smartphone or other device are provided to the connected device, and one or more controls of the smartphone or other device may be input using the connected device (e.g., by touch, voice, etc.).

The A/V devices 710, the hub device 702, the VA device 708, the automation devices 706, the sensors 704, and/or the client devices 714, 716 may also communicate, via the user's network 718 and/or the network (Internet/PSTN) 712, with network(s) of servers and/or backend devices 720, such as (but not limited to) one or more remote storage devices 722 (may be referred to interchangeably as "cloud storage device(s)"), one or more backend servers 724, and one or more backend application programming interfaces (APIs) 726. While FIG. 7 illustrates the storage device 722, the backend server 724, and the backend API 726 as components separate from the network 720, it is to be understood that the storage device 722, the backend server 724, and/or the backend API 726 may be considered to be components of the network 720. For example, the network 720 may include a data center with a plurality of computing resources used to implement the storage device 722, the backend server 724, and the backend API 726.

The backend server 724 may comprise a computer program or other computer executable code that, when executed by processor(s) of the backend server 724, causes the backend server 724 to wait for requests from other computer systems or software (clients) and provide responses. In implementations, the backend server 724 shares data and/or hardware and/or software resources among the client devices 714, 716. This architecture is called the client-server model. The client devices 714, 716 may run on the same computer or may connect to the backend server 724 over the network (Internet/PSTN) 712 and/or the network 720. Examples of computing servers include database servers, file servers, mail servers, print servers, web servers, game servers, and application servers. The term server may be construed broadly to include any computerized process that shares a resource to one or more client processes.

The backend API 726 may comprise, for example, a server (e.g. a real server, or a virtual machine, or a machine running in a cloud infrastructure as a service), or multiple servers networked together, exposing at least one API to clients. In various implementations, the backend API 726 is provided by servers including various components such as an application server (e.g. software servers), a caching layer, a database layer, or other components suitable for implementing one or more APIs. The backend API 726 may, for example, comprise a plurality of applications, each of which communicate with one another using one or more public APIs. In some implementations, the backend API 726 maintains user data and provides user management capabilities, thereby reducing the load (e.g., memory and processor consumption) of the client devices 714, 716.

In various implementations, an API is a set of routines, protocols, and tools for building software and applications. Furthermore, the API may describe a software component in terms of its operations, inputs, outputs, and underlying types, defining functionalities that are independent of their respective implementations, which allows definitions and implementations to vary without compromising the interface. As such, the API may provide a programmer with access to a particular application's functionality without the need to modify the particular application.

The backend API 726 illustrated in FIG. 7 may further include one or more services (also referred to as network services). A network service is an application that provides data storage, manipulation, presentation, communication, and/or other capability. Network services are often implemented using a client-server architecture based on application-layer network protocols. Each service may be provided by a server component (e.g., the backend server 724) running on one or more computers (such as a dedicated server computer offering multiple services) and accessed via a network by client components running on other devices (e.g., client devices 714, 716). However, the client and server components can both be run on the same machine. Clients and servers may have a user interface, and sometimes other hardware associated with them.

The network 720 may be any wireless network, any wired network, or a combination thereof, configured to operatively couple the above-mentioned modules, devices, components, and/or systems as illustrated in FIG. 7. For example, the network 720, the user's network 718, and/or the network (Internet PSTN) 712 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, global navigation satellite system (GNSS), such as global positioning systems (GPS), CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-4024 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

The hub device 702, the VA device 708, and/or any of the components of the network(s) of servers/backend devices 720 (e.g., the backend server 724, the backend API 726, the storage devices 722, etc.) may be referred to herein as a "network device" or "network devices."

With further reference to FIG. 7, the system 700 may also include a security monitoring service 728. The security monitoring service 728 may be operated by the same company that manufactures, sells, and/or distributes the A/V devices 710, the hub device 702, the VA device 708, the sensors 704, and/or the automation devices 706. In additional implementations, the security monitoring service 728 may be operated by a third-party company (e.g., a different company than the one that manufactured, sold, and/or distributed the A/V devices 710, the hub device 702, the VA device 708, the sensors 704, and/or the automation devices 706). In any of the present implementations, the security monitoring service 728 may have control of at least some of the features and components of the security system and/or the home-automation system (e.g., the security monitoring service 728 may be able to arm and/or disarm the security system, lock and/or unlock doors, activate and/or deactivate one or more of the sensors 704 and/or the automation devices 706, etc.). For example, the security monitoring service 728 may operate and control their own client devices and/or network of servers/backend devices for monitoring and/or controlling security systems. In such an example, the A/V devices 710, the hub device 702, the VA device 708, the sensors 704, and/or the automation devices 706 may communicate with the client devices and/or one or more components of the network of servers/backend devices of the security monitoring service 728 over the network (Internet/PSTN) 712 (in some implementations, via one or more of the components of the network of backend servers/backend devices 720).

Figure 8:
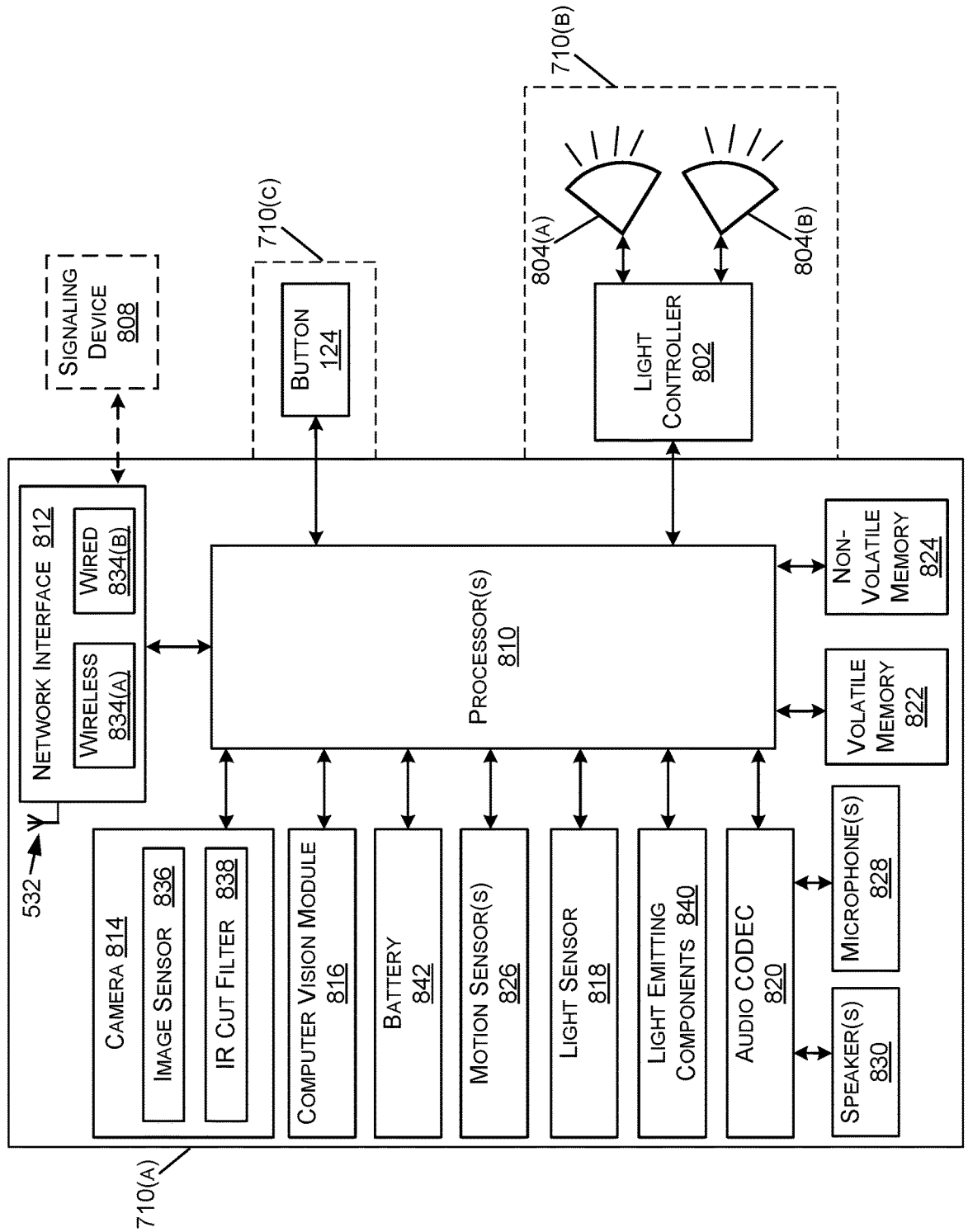
FIG. 8 is a functional block diagram illustrating one example implementation of an A/V doorbell, according to various aspects of the present disclosure.

FIG. 8 is a functional block diagram for an audio/video (A/V) device 106, 710 according to various aspects of the present disclosure. In some implementations, the one or more A/V devices 710 may include the security camera 710(a). In other implementations, the one or more A/V devices 710 may include the light camera 710(b), which may include some or all of the components of the security camera 710(a) in addition to a light controller 802 and one or more lights 804(a), 804(b). In some implementations, the one or more A/V devices 710 may include the video doorbell 710(c), which may include some or all of the components of the security camera 710(a) in addition to a button 806, and in some implementations, a connection to a signaling device 808 (e.g., a pre-installed signaling device, such as a wired signaling device, and/or a wireless signaling device, connected over Wi-Fi, BLE, or another wireless communication protocol). In illustrative implementations, the A/V device 106 of FIG. 1 may include some or all of the components included in the A/V device of FIG. 8 and the signaling device 808 may correspond to the signaling device 134 of FIG. 1.

With further reference to FIG. 8, the A/V device 710 may include a processor(s) 810, a network interface 812, a camera 814, a computer vision module 816, a light sensor 818, an audio CODEC (coder-decoder) 820, volatile memory 822, and non-volatile memory 824. The processor(s) 810 (alternatively referred to herein as a "CPU," a "controller," and/or a "microcontroller) may comprise an integrated circuit including a processor core, memory, and programmable input/output peripherals. The processor(s) 810 may receive input signals, such as data and/or power, from the camera 814, motion sensor(s) 826, light sensor 818, microphone(s) 828, speaker(s) 830, and/or the network interface 812, and may perform various functions as described in the present disclosure. In various implementations, when the processor(s) 810 is triggered by the motion sensor(s) 826, the camera 814, the speaker(s) 830, the microphone(s) 828, the network interface 812, and/or another component, the processor(s) 810 performs one or more processes and/or functions. For example, when the light sensor 818 detects a low level of ambient light, the light sensor 818 may trigger the processor(s) 810 to enable a night vision camera mode. The processor(s) 810 may also provide data communication between various components such as between the network interface 812 and the camera 814.

With further reference to FIG. 8, the network interface 812 may comprise an integrated circuit including a processor core, memory, and programmable input/output peripherals. The network interface 812 may be operatively connected to the processor(s) 810. In some implementations, the network interface 812 is configured to handle communication links between the A/V device 710 and other, external devices, external receivers, external transmitters, and/or external transceivers, and to route incoming/outgoing data appropriately. For example, inbound data from an antenna 832 of the network interface 812 may be routed through the network interface 812 before being directed to the processor(s) 810, and outbound data from the processor(s) 810 may be routed through the network interface 812 before being directed to the antenna 832 of the network interface 812. As another example, the network interface 812 may be configured to transmit data to and/or receive data from a remote network device (e.g., one or more components of the network(s) of servers/backend devices 720 described in FIG. 7). The network interface 812 may include wireless 834(*a*) and wired 834(*b*) adapters. For example, the network interface 312 may include one or more wireless antennas, radios, receivers, transmitters, and/or transceivers (not shown in FIG. 8 for simplicity) configured to enable communication across one or more wireless networks, such as, without limitation, Wi-Fi, cellular, Bluetooth, Z-Wave, Zigbee, LPWAN(s), and/or satellite networks. The network interface 812 may receive inputs, such as power and/or data, from the camera 814, the processor(s) 810, the button 806 (in implementations where the A/V device 710 is the video doorbell 710(*c*)), the motion sensors 826, a reset button (not shown in FIG. 8 for simplicity), and/or the non-volatile memory 824. The network interface 812 may also include the capability of communicating over wired connections, such as with a signaling device 808 (e.g., signaling device load 130 with signaling controller 132 and signaling device 134). For example, when the button 806 of the video doorbell 710(*c*) is pressed, the network interface 812 may be triggered to perform one or more functions, such as to transmit a signal over the wired 834(*b*) connection to the signaling device 808 (although, in some implementations, the signal be transmitted over a wireless 834(*a*) connection to the signaling device) to cause the signaling device 808 to emit a sound (e.g., a doorbell tone, a user customized sound, a ringtone, a seasonal ringtone, etc.). The network interface 812 may also act as a conduit for data communicated between various components and the processor(s) 810.

With further reference to FIG. 8, the A/V device 710 may include the non-volatile memory 824 and the volatile memory 822. The non-volatile memory 824 may comprise flash memory configured to store and/or transmit data. For example, in certain implementations the non-volatile memory 824 may comprise serial peripheral interface (SPI) flash memory. In some implementations, the non-volatile memory 824 may comprise, for example, NAND or NOR flash memory. The volatile memory 822 may comprise, for example, DDR3 SDRAM (double data rate type three synchronous dynamic random-access memory). In the implementation illustrated in FIG. 8, the volatile memory 822 and the non-volatile memory 824 are illustrated as being separate from the processor(s) 810. However, the illustration of FIG. 8 is not intended to be limiting, and in some implementations the volatile memory 822 and/or the non-volatile memory 824 may be physically incorporated with the processor(s) 810, such as on the same chip. The volatile memory 822 and/or the non-volatile memory 824, regardless of their physical location, may be shared by one or more other components (in addition to the processor(s) 810) of the present A/V device 710.

With further reference to FIG. 8, the A/V device 710 may include the camera 814. The camera 814 may include an image sensor 836. The image sensor 836 may include a video recording sensor and/or a camera chip. In one aspect of the present disclosure, the imager sensor 836 may comprise a complementary metal-oxide semiconductor (CMOS) array and may be capable of recording high definition (e.g., 722p, 1800p, 4K, etc.) video files. The camera 814 may include a separate camera processor (not shown in FIG. 8 for simplicity), or the processor(s) 810 may perform the camera processing functionality. The processor(s) 810 (and/or camera processor) may include an encoding and compression chip. In some implementations, the processor(s) 810 (and/or the camera processor) may comprise a bridge processor. The processor(s) 810 (and/or the camera processor) may process video recorded by the image sensor 836 and/or audio recorded by the microphone(s) 828 and may transform this data into a form suitable for transfer by the network interface 812 to the network (Internet/PSTN) 712. In various implementations, the camera 814 also includes memory, such as volatile memory that may be used when data is being buffered or encoded by the processor(s) 810 (and/or the camera processor). For example, in certain implementations the camera memory may comprise synchronous dynamic random-access memory (SD RAM).

The camera 814 may further include an IR cut filter 838 that may comprise a system that, when triggered, configures the image sensor 836 to see primarily infrared light as opposed to visible light. For example, when the light sensor 818 detects a low level of ambient light (which may comprise a level that impedes the performance of the image sensor 836 in the visible spectrum), the light emitting components 840 may shine infrared light through an enclosure of the A/V device 710 out to the environment, and the IR cut filter 838 may enable the image sensor 836 to see this infrared light as it is reflected or refracted off of objects within the field of view of the doorbell. This process may provide the A/V device with the "night vision" function mentioned above.

With further reference to FIG. 8, the recording and communication A/V device 710 may comprise the light sensor 818 and the one or more light-emitting components 840, such as LED's. The light sensor 818 may be one or more sensors capable of detecting the level of ambient light of the surrounding environment in which the A/V device 710 may be located. The light-emitting components 840 may be one or more light-emitting diodes capable of producing visible light when supplied with power (e.g., to enable night vision). In some implementations, when activated, the light-emitting components 840 illuminates a light pipe.

The A/V device 710 may further include one or more speaker(s) 830 and/or one or more microphone(s) 828. The speaker(s) 830 may be any electromechanical device capable of producing sound in response to an electrical signal input. The microphone(s) 828 may be an acoustic-to-electric transducer or sensor capable of converting sound waves into an electrical signal. In some implementations, the A/V device 710 may include two or more microphone(s) 828 that are spaced from one another (e.g., located on different sides of the A/V device 710) to provide noise cancelling and/or echo cancelling for clearer audio. The speaker(s) 830 and/or microphone(s) 828 may be coupled to an audio CODEC 820 to enable digital audio received by client devices to be decompressed and output by the speaker(s) 830 and/or to enable audio data captured by the microphone(s) 828 to be compressed into digital audio data. The digital audio data may be received from and transmitted to client devices using the network interface 812 (in some implementations, through one or more intermediary devices such as the hub device 702, the VA device 708, and/or one or more components of the network of servers/backend devices 720 as described in FIG. 7). For example, when a visitor (or intruder) who is present in the area about the A/V device 710 speaks, sound from the visitor (or intruder) is received by the microphone(s) 828 and compressed by the audio CODEC 820. Digital audio data is then sent through the network interface 812 to the network 712 via the user's network 718, routed by the backend server 724 and/or the backend API 726 and delivered to the client device(s) 714, 716 as described above in connection with FIG. 7. When the user speaks, after being transferred through the network 712, the user's network 718, and the network interface 812, the digital audio data from the user is decompressed by the audio CODEC 820 and emitted to the visitor through the speaker(s) 830.

With further reference to FIG. 8, the A/V device 710 may be powered using one or more supercapacitors 842 and/or may be powered using a source of external AC (alternating-current) power, such as a household AC power supply (alternatively referred to herein as "AC mains" or "wall power"). The AC power may have a voltage in the range of 110-220 VAC, for example. The incoming AC power may be received by an AC/DC adapter (not shown), which may convert the incoming AC power to DC (direct-current) and may step down the voltage from 110-220 VAC to a lower output voltage of about 12 VDC and an output current of about 2 A, for example. In various implementations, the output of the AC/DC adapter is in a range from about 9 V to about 15 V and in a range from about 0.5 A to about 5 A. These voltages and currents are examples provided for illustration and are not intended to be limiting.

In implementations described herein, a battery may not be included in the A/V device 710. In various implementations, the A/V device 710 may include an integrated circuit (not shown) capable of arbitrating between multiple voltage rails, thereby selecting the source of power for the A/V device 710. In one aspect of the disclosure, the A/V device 710 may continuously draw power from the AC power supply, such as AC power supply 116, to power the A/V device 710 via doorbell circuits described herein. In example embodiments, the A/V device 710 may draw power from portions of an AC waveform that powers both the A/V device 710 and the signaling device 808. This A/V waveform may be a step-down version of the AC line power 116, as described herein. In some cases, one of the positive or negative phase of the AC waveform may be used to power the A/V device 710 and the other of the positive or negative phase of the AC waveform may be used to power the signaling device 808.

Although not illustrated in FIG. 8, in some implementations, the A/V device 710 may include one or more of an accelerometer, a barometer, a humidity sensor, and a temperature sensor. The accelerometer may be one or more sensors capable of sensing motion and/or acceleration. The one or more of the accelerometer, the barometer, the humidity sensor, and the temperature sensor may be located outside of a housing of the A/V device 710 so as to reduce interference from heat, pressure, moisture, and/or other stimuli generated by the internal components of the A/V device 710.

With further reference to FIG. 8, the A/V device 710 may include one or more motion sensor(s) 826. However, in some implementations, the motion sensor(s) 826 may not be included, such as where motion detection is performed by the camera 814 or another device. The motion sensor(s) 826 may be any type of sensor capable of detecting and communicating the presence of an entity within their field of view. As such, the motion sensor(s) 826 may include one or more (alone or in combination) different types of motion sensors. For example, in some implementations, the motion sensor(s) 826 may comprise passive infrared (PIR) sensors, which may be secured on or within a PIR sensor holder that may reside behind a lens (e.g., a Fresnel lens). In such an example, the PIR sensors may detect IR radiation in a field of view, and produce an output signal (typically a voltage) that changes as the amount of IR radiation in the field of view changes. The amount of voltage in the output signal may be compared, by the processor(s) 810, for example, to one or more threshold voltage values to determine if the amount of voltage in the output signal is indicative of motion, and/or if the amount of voltage in the output signal is indicative of motion of an entity that is to be captured by the camera 814 (e.g., motion of a person and/or animal may prompt activation of the camera 814, while motion of a vehicle may not). Although the above discussion of the motion sensor(s) 826 primarily relates to PIR sensors, depending on the implementation, the motion sensor(s) 826 may include additional and/or alternate sensor types that produce output signals including alternative data types. For example, and without limitation, the output signal may include an amount of voltage change based on the presence of infrared radiation in a field of view of an active infrared (AIR) sensor, the output signal may include phase shift data from a microwave-type motion sensor, the output signal may include doppler shift data from an ultrasonic-type motion sensor, the output signal may include radio wave disturbance from a tomographic-type motion sensor, and/or the output signal may include other data types for other sensor types that may be used as the motion sensor(s) 826 of the A/V device 710.

In some implementations, computer vision module(s) (CVM) 816 may be included in the A/V device 710 as the motion sensor(s) 826, in addition to, or alternatively from, other motion sensor(s) 826. For example, the CVM 816 may be a low-power CVM (e.g., Qualcomm Glance) that, by operating at low power (e.g., less than 2 mW of end-to-end power), is capable of providing computer vision capabilities and functionality for battery powered devices (e.g., the A/V device 710 when powered by the one or more supercapacitors 842). The low-power CVM may include a lens, a CMOS image sensor, and a digital processor that may perform embedded processing within the low-power CVM itself, such that the low-power CVM may output post-processed computer vision metadata to the processor(s) 810 (e.g., via a serial peripheral bus interface (SPI)). As such, the low-power CVM may be considered to be one or more of the motion sensor(s) 826, and the data type output in the output signal may be the post-processed computer vision metadata. The metadata may include information such as the presence of a particular type of entity (e.g., person, animal, vehicle, parcel, etc.), a direction of movement of the entity, a distance of the entity from the A/V device 710, etc. In various implementations, the motion sensor(s) 826 include a plurality of different sensor types capable of detecting motion such as PIR, AIR, low-power CVM, and/or cameras.

As indicated above, the A/V device 710 may include the CVM 816 (which may be the same as the above described low-power CVM 816 implemented as one or more motion sensor(s) 826, or may be additional to, or alternative from, the above described low-power CVM 816). For example, the A/V device 710, the hub device 702, the VA device 708, and/or one or more component of the network(s) of servers/backend devices 720 may perform any or all of the computer vision processes and functionalities described herein. In addition, although the CVM 816 is only illustrated as a component of the A/V device 710, the computer vision module 816 may additionally, or alternatively, be included as a component of the hub device 702, the VA device 708, and/or one or more components of the network of servers/backend devices 720. With respect to the A/V device 710, the CVM 816 may include any of the components (e.g., hardware) and/or functionality described herein with respect to computer vision, including, without limitation, one or more cameras, sensors, and/or processors. In some of the present implementations, with reference to FIG. 8, the microphone(s) 828, the camera 814, the processor(s) 810, and/or the image sensor 836 may be components of the CVM 816. In some implementations, the CVM 816 may include an internal camera, image sensor, and/or processor, and the CVM 816 may output data to the processor(s) 810 in an output signal, for example.

As a result of including the CVM 816, some of the present implementations may leverage the CVM 816 to implement computer vision for one or more aspects, such as motion detection, object recognition, and/or facial recognition. Computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Examples include detection of possible abnormal cells or tissues in medical images or detection of a vehicle in an automatic road toll system. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)—Identifying characters in images of printed or handwritten text, usually with a view to encoding the text in a format more amenable to editing or indexing (e.g., ASCII). 2D Code Reading—Reading of 2D codes such as data matrix and QR codes. Facial Recognition. Shape Recognition Technology (SRT)—Differentiating human beings (e.g., head and shoulder patterns) from objects.

Image acquisition—A digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance.

Pre-processing—Before a computer vision method can be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information can be detected, and scale space representation to enhance image structures at locally appropriate scales.

Feature extraction—Image features at various levels of complexity are extracted from the image data. Typical examples of such features are: Lines, edges, and ridges; Localized interest points such as corners, blobs, or points; More complex features may be related to texture, shape, or motion.

Detection/segmentation—At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy).

High-level processing—At this step, the input may be a small set of data, for example a set of points or an image region that is assumed to contain a specific object. The remaining processing may comprise, for example: Verification that the data satisfy model-based and application-specific assumptions; Estimation of application-specific parameters, such as object pose or object size; Image recognition—classifying a detected object into different categories; Image registration—comparing and combining two different views of the same object.

Decision making—Making the final decision required for the application, for example match/no-match in recognition applications.

One or more of the present implementations may include a vision processing unit (not shown separately, but may be a component of the CVM 816). A vision processing unit is an emerging class of microprocessor; it is a specific type of AI (artificial intelligence) accelerator designed to accelerate machine vision tasks. Vision processing units are distinct from video processing units (which are specialized for video encoding and decoding) in their suitability for running machine vision algorithms such as convolutional neural networks, SIFT, etc. Vision processing units may include direct interfaces to take data from cameras (bypassing any off-chip buffers), and may have a greater emphasis on on-chip dataflow between many parallel execution units with scratchpad memory, like a manycore DSP (digital signal processor). But, like video processing units, vision processing units may have a focus on low precision fixed-point arithmetic for image processing.

Some of the present implementations may use facial recognition hardware and/or software, as a part of the computer vision system. Various types of facial recognition exist, some or all of which may be used in the present implementations.

Some facial recognition algorithms identify facial features by extracting landmarks, or features, from an image of the subject's face. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face recognition. A probe image is then compared with the face data. One of the earliest successful systems is based on template matching techniques applied to a set of salient facial features, providing a sort of compressed face representation.

Recognition algorithms can be divided into two main approaches, geometric, which looks at distinguishing features, or photometric, which is a statistical approach that distills an image into values and compares the values with templates to eliminate variances.

Popular recognition algorithms include principal component analysis using eigenfaces, linear discriminant analysis, elastic bunch graph matching using the Fisherface algorithm, the hidden Markov model, the multilinear subspace learning using tensor representation, and the neuronal motivated dynamic link matching.

Further, a newly emerging trend, claimed to achieve improved accuracy, is three-dimensional face recognition. This technique uses 3D sensors to capture information about the shape of a face. This information is then used to identify distinctive features on the surface of a face, such as the contour of the eye sockets, nose, and chin.

One advantage of 3D face recognition is that it is not affected by changes in lighting like other techniques. It can also identify a face from a range of viewing angles, including a profile view. Three-dimensional data points from a face vastly improve the precision of face recognition. 3D research is enhanced by the development of sophisticated sensors that do a better job of capturing 3D face imagery. The sensors work by projecting structured light onto the face. Up to a dozen or more of these image sensors can be placed on the same CMOS chip—each sensor captures a different part of the spectrum.

Another variation is to capture a 3D picture by using three tracking cameras that point at different angles; one camera pointing at the front of the subject, a second one to the side, and a third one at an angle. All these cameras work together to track a subject's face in real time and be able to face detect and recognize.

Another emerging trend uses the visual details of the skin, as captured in standard digital or scanned images. This technique, called skin texture analysis, turns the unique lines, patterns, and spots apparent in a person's skin into a mathematical space.

Another form of taking input data for face recognition is by using thermal cameras, which may only detect the shape of the head and ignore the subject accessories such as glasses, hats, or make up.

Further examples of automatic identification and data capture (AIDC) and/or computer vision that can be used in the present implementations to verify the identity and/or authorization of a person include, without limitation, biometrics. Biometrics refers to metrics related to human characteristics. Biometrics authentication (or realistic authentication) is used in various forms of identification and access control. Biometric identifiers are the distinctive, measurable characteristics used to label and describe persons. Biometric identifiers can be physiological characteristics and/or behavioral characteristics. Physiological characteristics may be related to the shape of the body. Examples include, but are not limited to, fingerprints, palm veins, facial recognition, three-dimensional facial recognition, skin texture analysis, DNA, palm prints, hand geometry, iris recognition, retina recognition, and odor/scent recognition. Behavioral characteristics may be related to the pattern of behavior of a person, including, but not limited to, typing rhythm, gait, and voice recognition.

The present implementations may use any one, or any combination of more than one, of the foregoing biometrics to identify and/or authenticate a person who is either suspicious or who is authorized to take certain actions with respect to a property or expensive item of collateral. For example, with reference to FIG. 8, the CVM 816, and/or the camera 814 and/or the processor(s) 810 may receive information about the person using any one, or any combination of more than one, of the foregoing biometrics.

Again, with reference to FIG. 8, in implementations where the A/V device 710 includes a light camera, the A/V device 710 may include the light controller 802 and one or more lights 804(a), 804(b) (collectively referred to herein as "lights 804"). The light controller 802 may include a switch for controlling the lights 804. For example, in response to the motions sensor(s) 826 and/or the camera 814 detecting motion, the light controller 802 may receive an output signal from the processor(s) 810 that causes the light controller 802 to activate the one or more lights 304(a), 304(b). In some implementations, the light camera may include motion sensor(s) 826 detecting motion for controlling activation of the lights 804, and may further include the camera 814 for detecting motion for activating the recording of the image data using the camera 814 and/or the recording of the audio data using the microphone(s) 828. In other implementations, the motion sensor(s) 826 may detect the motion for activating the lights 804, the camera 814, and the microphone(s) 828, or the camera 814 may detect the motion for activating the lights 804, the camera 814 to being recording the image data, and the microphone(s) 828 to being recording the audio data. The lights 804 may include floodlights, spotlights, porch lights, or another type of illumination device. The lights 804 may provide for better image data quality when ambient light levels are low (e.g., at dusk, dawn, or night), while also providing a deterrent effect by being illuminated when motion is detected.

With further reference to FIG. 8, in implementations where the A/V device 710 includes a doorbell, such as the video doorbell 710(c), the A/V device 710 may include the button 124. In implementations where the button 124 is a mechanical button (e.g., has a range of movement), the button 124 may make contact with a button actuator located within the video doorbell 710(c) when the button 124 is pressed. In implementations where the button 124 is not mechanical (e.g., has no range of motion), the button 124 may include a capacitive touch button, a resistive touch button, a surface acoustic wave (SAW) button, an infrared (IR) button, an optical imaging button, an acoustic pulse recognition button, and/or a button that implements a low-power CVM for the detection of a person (e.g., a finger, hand, etc., of a person). When the button 124 is pressed, touched, and/or otherwise triggered, the processor(s) 810 may receive an output signal from the button 124 that may activate one or more functions of the video doorbell 710(c), such as transmitting an output signal, using the network interface 812, to the signaling device 808 to cause the signaling device 808 to output a sound (e.g., via the wired 834(b) connection to the signaling device 808 and/or a wireless 834(a) connection to the signaling device 308). In addition, the processor(s) 810 may transmit an output signal (e.g., a message), using the network interface 812, to the client device(s) 714, 716 to indicate to the user(s) of the client device(s) 714, 716 that a person is present at the A/V device 710 (in some implementations, via at least one of the hub device 702, the VA device 708, and/or one or more component of the network of servers/backend devices 720).

Although the A/V recording and communication device 710 (or A/V device 710) is referred to herein as an "audio/video" device, the A/V device 710 need not have both audio and video functionality. For example, in some implementations, the A/V device 710 may not include the speakers 830, microphones 828, and/or audio CODEC. In such examples, the A/V device 710 may only have video recording and communication functionalities. In other examples, the A/V device 710 may only have the speaker(s) 830 and not the microphone(s) 828 or may only have the microphone(s) 828 and not the speaker(s) 830.

Figure 9:
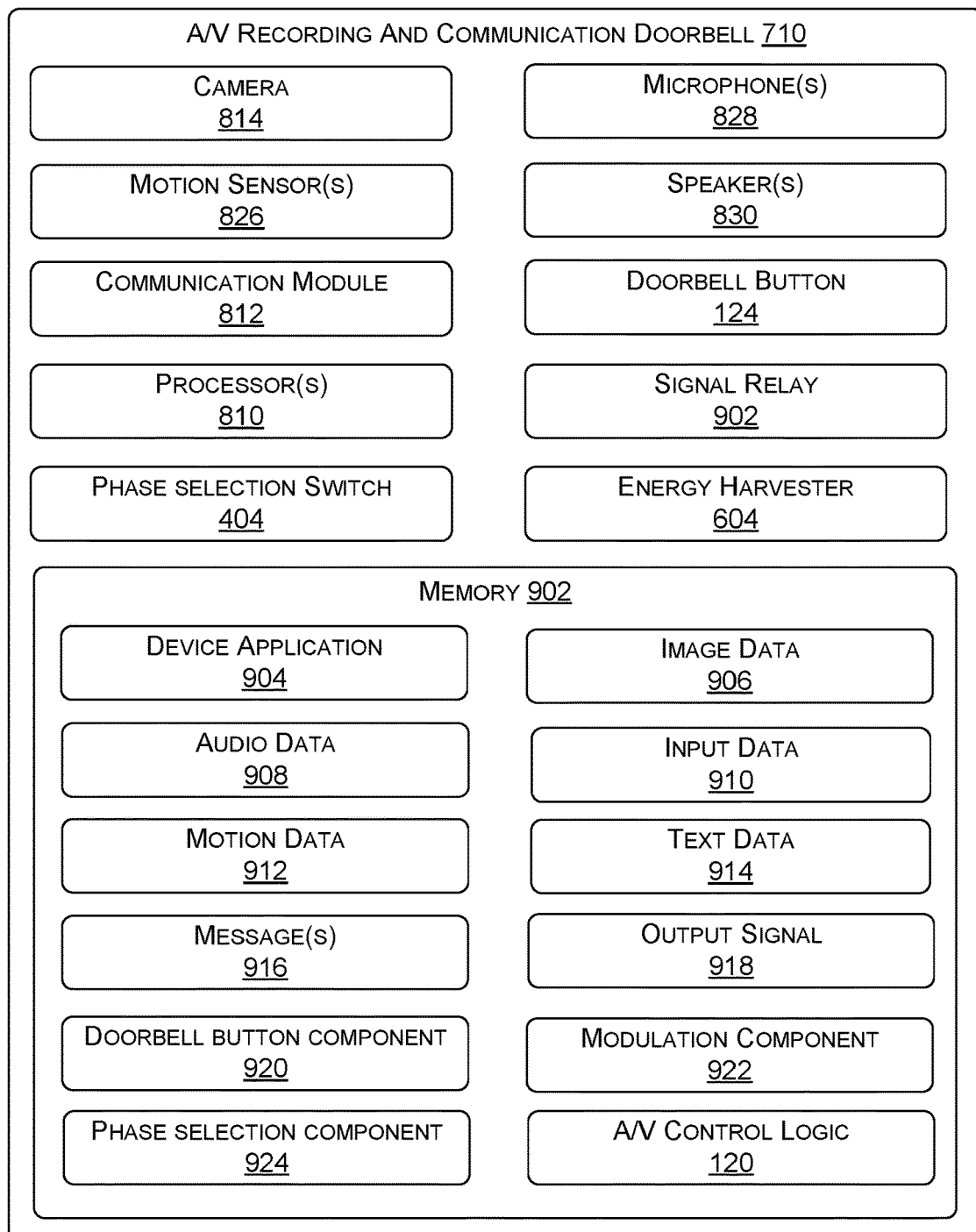
FIG. 9 is a functional block diagram illustrating an A/V doorbell, according to various aspects of the present disclosure.

FIG. 9 is another functional block diagram illustrating an implementation of the A/V device 710, according to various aspects of the present disclosure. The A/V device 710 may be an example implementation of the A/V doorbell 106. In some implementations, the A/V device 710 may represent, and further include one or more of the components from, the A/V recording and communication doorbell 710(c), the A/V recording and communication security camera 710(a), and/or the floodlight controller 710(b). Additionally, in some implementations, the A/V device 710 may omit one or more of the components shown in FIG. 9 and/or may include one or more additional components not shown in FIG. 9.

As shown in FIG. 9, the A/V device 710 includes memory 902, which may represent the volatile memory 822 and/or the non-volatile memory 824. The memory 902 stores a device application 904. In various implementations, the device application 904 may configure the processor(s) 810 to capture image data 906 using the camera 814, audio data 908 using the microphone(s) 828, input data 910 using the button 806 (and/or the camera 814 and/or the motion sensor(s) 826, depending on the implementation), and/or motion data 912 using the camera 814 and/or the motion sensor(s) 826. In some implementations, the device application 904 may also configure the processor(s) 810 to generate text data 914 describing the image data 906, the audio data 908, and/or the input data 910, such as in the form of metadata, for example.

In addition, the device application 904 may configure the processor(s) 810 to transmit the image data 906, the audio data 908, the motion data 912, the input data 910, the text data 914, and/or message(s) 916 to the client devices 714, 716, the hub device 702, and/or the backend server 724 using the network interface 812. In various implementations, the device application 904 may also configure the processor(s) 810 to generate and transmit an output signal 918 that may include the image data 906, the audio data 908, the text data 914, the input data 910, and/or the motion data 912. In some of the present implementations, the output signal 918 may be transmitted to the backend server 724 and/or the hub device 702 using the network interface 812. The backend server 724 may then transmit (or forward) the output signal 918 to the client device(s) 714, 716, and/or the hub device 702 may then transmit (or forward) the output signal 918 to the client device(s) 714, 716, and/or the hub device 702 may then transmit (or forward) the output signal 918 to the backend server 724, and the backend server 724 may then transmit (or forward) the output signal 918 to the client device(s) 714, 716. In other implementations, the output signal 918 may be transmitted directly to the client device(s) 714, 716 by the A/V device 710.

In further reference to FIG. 9, the image data 906 may comprise image sensor data such as (but not limited to) exposure values and data regarding pixel values for a particular sized grid. The image data 906 may include still images, live video, and/or pre-recorded images and/or video. The image data 906 may be recorded by the camera 814 in a field of view of the camera 814. The image data 906 may be representative of (e.g., depict) a physical environment in a field of view of the camera 906. In some implementations, the physical environment may include one or more objects (e.g., persons, vehicles, animals, items, etc.), and the image data 906 may be representative of the one or more objects, such as the one or more objects within the physical environment.

In further reference to FIG. 9, the motion data 912 may comprise motion sensor data generated in response to motion events. For example, the motion data 912 may include an amount or level of a data type generated by the motion sensor(s) 826 (e.g., the voltage level output by the motion sensor(s) 826 when the motion sensor(s) 826 are PIR type motion sensor(s)). In some of the present implementations, such as those where the A/V device 710 does not include the motion sensor(s) 826, the motion data 912 may be generated by the camera 814. In such implementations, based on a frame by frame comparison of changes in the pixels from the image data 906, it may be determined that motion is present.

The input data 910 may include data generated in response to an input to the button 124. The button 124 may receive an input (e.g., a press, a touch, a series of touches and/or presses, etc.) and may generate the input data 910 in response that is indicative of the type of input. This input data 910 may be indicative of the doorbell button 124 being pressed. Thus, the A/V device 710 may be configured to identify based at least in part on the input data 910 that the doorbell button 124 has been pressed. The A/V device 710 may further be configured to notify the signaling controller that the doorbell button has been pressed by controlling the switch 902 (e.g., the switch 210, 230) to toggle and/or modulate an indication of the doorbell button being pressed that may be sensed by the signaling controller 132.

With further reference to FIG. 9, a message 916 may be generated by the processor(s) 810 and transmitted, using the network interface 812, to the client device 714, 716, the backend server 724, and/or the hub device 702. For example, in response to detecting motion using the camera 814 and/or the motion sensor(s) 826, the A/V device 710 may generate and transmit the message 916. In some of the present implementations, the message 916 may include at least the image data 906, the audio data 908, the text data 914, and/or the motion data 912.

As described herein, the message(s) 916 may include alerts, signals, data, notifications, and/or any type of electronic communication that electronic devices (e.g., the A/V device 710, the client device 714, 716, the hub device 702, and/or one or more components of the network(s) of servers/backend devices 720) may transmit and receive with other electronic devices (e.g., the A/V device 710, the client device 714, 716, the hub device 702, and/or one or more components of the network(s) of servers/backend devices 720). For instance, message(s) 916 may include push notifications, email messages, short message service (SMS) messages, multimedia messages (MMS), voicemail messages, video signals, audio signals, data transmissions, and/or any other type of electronic communication that an electronic device can send to another electronic device.

The image data 906, the audio data 908, the text data 914, and/or the motion data 912 may be tagged with (e.g., a time stamp, based on clock data) and/or stored separately (e.g., on the backend server 724, the hub device 702, and/or the A/V device 710) based on when the motion was detected, how long the motion was detected for, and/or a duration of time associated with the detected motion, or motion event (e.g., the duration of time may include the time the motion was detected plus an additional time, such as, without limitation, 5 seconds, 10 seconds, or 30 seconds). For example, each separate detection of motion, or motion event, may be associated with image data 906, audio data 908, text data 914, and/or motion data 912 representative of the detection of motion, or motion event. As a result, when a request for data pertaining to particular motion event, or a particular time period, is received (e.g., by the client device 714, 716, the backend server 724, and/or the hub device 702), the image data 906, the audio data 908, the text data 914, and/or the motion data 912 associated with a particular motion event, and/or associated with motion event(s) within the particular time period, may be transmitted, retrieved, and/or received.

Although examples discuss the A/V device 710 generating and transmitting the image data 906, the audio data 908, the text data 914, and/or the motion data 912 when motion is detected (e.g., in the message 916), in other examples the data may be generated and/or transmitted at other times. For example, the image data 906, the audio data 908, the text data 914, and/or the motion data 912 may be generated and transmitted continuously (e.g., in a streaming manner), periodically, upon request, etc. In examples where the image data 906, the audio data 908, the text data 914, and/or the motion data 912 may be generated and transmitted continuously, the detection of motion (e.g., a motion event) may cause an indication of when the motion was detected (e.g., a time stamp) and/or how long the motion was detected for (e.g., a duration) to be associated with the image data 906, the audio data 908, the text data 914, and/or the motion data 912. As a result, even though the image data 906, the audio data 908, the text data 914, and/or the motion data 412 may be continuously generated by the A/V device 710, the image data 906, the audio data 908, the text data 914, and/or the motion data 912 associated with motion events may be tagged and/or stored separately (e.g., similar to that of the image data 906, the audio data 908, the text data 914, and/or the motion data 912 generated in response to the detection of motion), from the image data 906, the audio data 908, the text data 914, and/or the motion data 912 that is not associated with motion events.

As described herein, at least some of the processes of the backend server 724, the hub device 702, and/or the client device 714, 716 may be executed by the A/V device 710. In particular implementations, the memory 902 may also store a doorbell button component 920. The doorbell button component 920 may enable the processor(s) 810 to monitor and/or receive an indication that the doorbell button 124 has been pressed. Thus, the A/V doorbell 106 may be notified of the doorbell button being pressed, which may trigger other actions, such as indicating to the signaling controller 132 that the signaling device 134 is to be activated.

In example embodiments, the memory 902 may further store a modulation component 922 to enable the A/V device 710 to control a switch 902, such as the switch 210 or the switch 230, to alter the AC waveform that may be monitored by the signaling controller 132. The A/V device 710 may generate the control signal to toggle the switch 902. For example, to signal that the signaling device is to be activated, the switch may be closed for a predetermined amount of time and/or portion or number of cycles of the AC waveform. In alternate embodiments, protocol based digital communications may be performed by modulating the switch 902. In some cases, the doorbell circuit may not be used, such as by disrupting a monitored current to communicate that the signaling device is to be activated. In these cases, out-of-band communications, such as Wi-Fi direct, BT, BLE, or the like may be used for communicating between the A/V doorbell 106 and the signaling device controller 132.

In example embodiments, the memory may further store a phase selection component 924 that enables the A/V doorbell 106 to control the phase selection switch 404 to select portions of the AC waveform to provide power to the A/V doorbell 106. The phase selection switch 404 may be controlled using a control signal generated by the A/V doorbell 106. In some cases, the generation of the control signal may involve coordination with the signaling controller 132.

Figure 10:
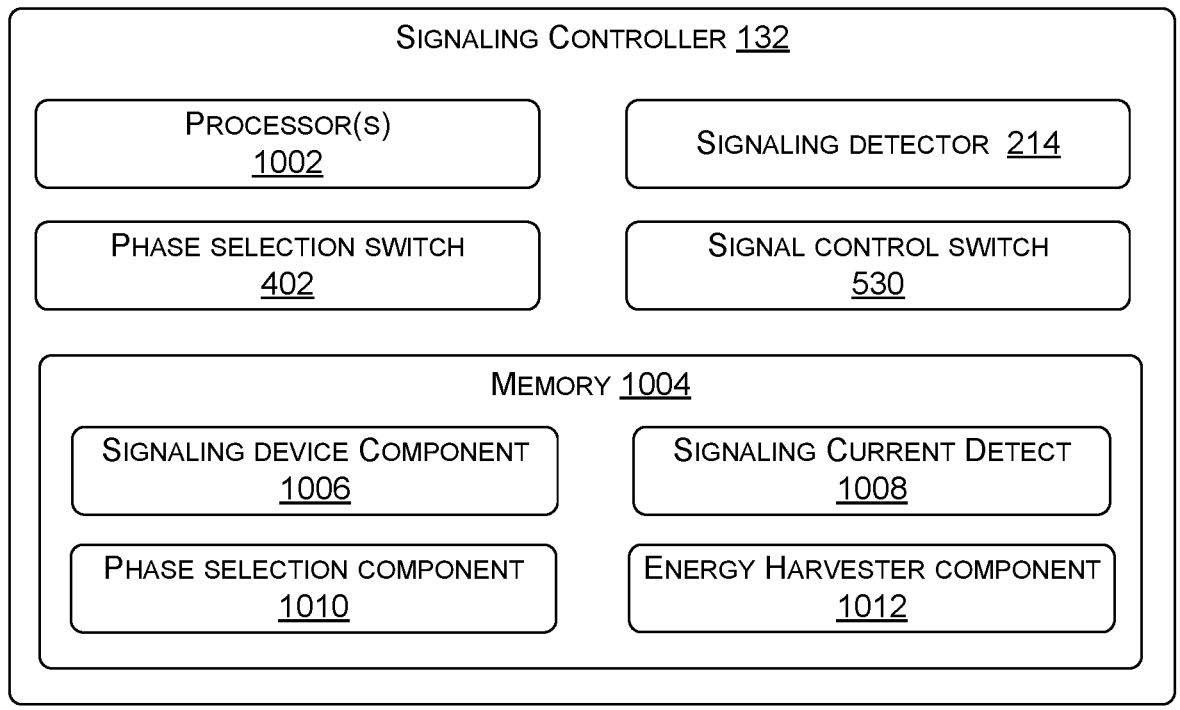
FIG. 10 is a functional block diagram illustrating one example implementation of a signaling controller, according to various aspects of the present disclosure.

FIG. 10 illustrates a functional block diagram illustrating one example embodiment of the signaling controller 132, according to various aspects of the present disclosure. The signaling controller 132 may include one or more processors 1002 to power and/or perform the various functions described herein of the signaling controller 132. The processor(s) 1002 (alternatively referred to herein as a "CPU," a "controller," and/or a "microcontroller") may comprise an integrated circuit including a processor core, memory, and programmable input/output peripherals. The signaling controller 132 further may include the signaling detector 214, the phase selection switch 402, and the signal control switch 530.

The signaling controller 132 may further include memory 1004, which may represent volatile memory and/or non-volatile memory. The memory 1004 may store a signaling device component 1006 and a signaling current detect 1008. The signaling controller 132 may be configured to use the signaling detector 214 to monitor current passing through the signaling detector 214. In example embodiments, the signaling detector 214 may be a resistor, or alternatively any other component with an impedance across which a voltage may be measured, to determine the current passing therethrough. This current may be altered or disrupted by the A/V doorbell 106 to indicate that the signaling device 134 is to be activated. Thus, the processor(s) 1002 may be enabled, by the signaling device component 1006 and the signaling current detect 1008, to detect any alteration in the current through, or voltage across, the signaling detector 214. If an alteration in the current is detected for a threshold period of time, then the signaling device may close the signal control switch 530 to energize the signaling device 134.

The memory 1004 may store a phase selection component 1010, which may enable the signaling controller 132 to control the phase selection switch 402 to select portions of the AC waveform to provide power to the signaling device load 130. The phase selection switch 402 may be controlled using a control signal generated by the signaling controller 132. In some cases, the generation of the control signal may involve coordination with the A/V control logic 120 to determine portions of the AC waveform that are not used to power the A/V doorbell 106. The memory 1004 may store an energy harvester component 1012. In some cases, the signaling energy harvester 602 may be integrated with the signaling controller 132. The signaling controller 132 may be configured to receive power from a portion of the AC waveform of the doorbell circuit and direct a portion of that power to charge the energy storage device 612, 654.

Each of the processes described herein, including the processes 1100, 1200, 1300, and 1400, are illustrated as a collection of blocks in a logical flow graph, which represent a sequence of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks may be combined in any order and/or in parallel to implement the processes. Additionally, any number of the described blocks may be optional and eliminated to implement the processes.

Figure 11:
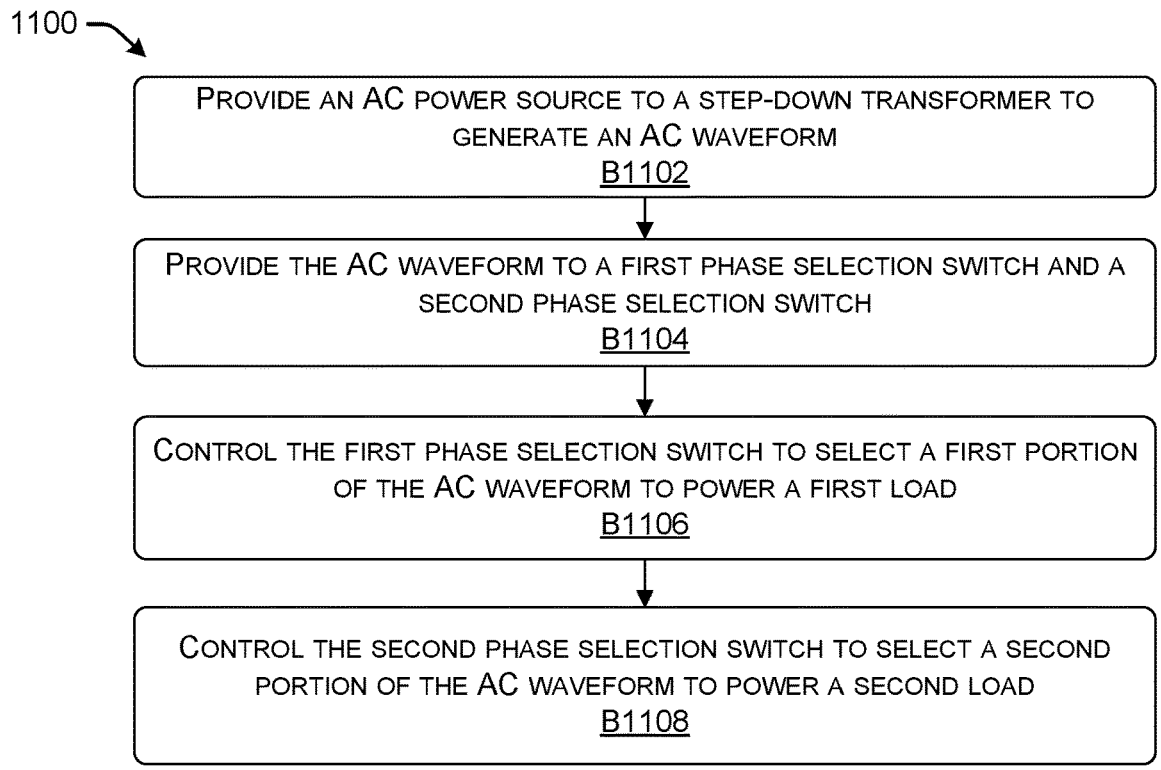
FIG. 11 is a flow diagram illustrating an example process for powering an A/V doorbell system with an AC power source using phase selection switches, according to various aspects of the present disclosure.

FIG. 11 is a flowchart illustrating an example process 1100 for powering an A/V doorbell system using an AC power source, according to various aspects of the present disclosure. The process 1100, at block B1102, includes providing an AC power source 116 to a step-down transformer 114 to generate an AC waveform. The AC waveform may be a voltage-scaled version of the AC power source 116. For example, the AC power source 116 may be 120 volts AC, and the AC waveform may be in the range of about 6 to 24 volts AC.

At block B1104, the AC waveform may be provided to a first phase selection switch and a second phase selection switch. These phase selection switches may be similar to the phase selections switches 402, 404 of FIG. 4A and/or the bypass switch 606 of FIG. 6A. The phase selection switches may be configured to be controlled to let current flow therethrough or block current therethrough. For example, when a phase selection switch is open, current may flow into one of the signaling device load 130, the A/V doorbell 106, and/or the signaling energy harvester 602.

At block 1106, the first phase selection switch may be controlled to select a first portion of the AC waveform to power a first load. In this case, the first load may be any generic load, or the signaling device load 130, and/or the A/V doorbell 106. At block 1108, the second phase selection switch may be controlled to select a second portion of the AC waveform to power a second load. In this case, the second load may be any generic load, or the signaling device load 130, and/or the A/V doorbell 106. In some cases, the first phase selection switch may be out of phase with the second phase selection switch. In other words, when the first phase selection switch is open, the second phase selection switch may be closed, and vice-versa. In this way, non-overlapping portions of the AC waveform may be used to power the first and second loads, such as the signaling device load 130 and the A/V doorbell 106.

Figure 12:
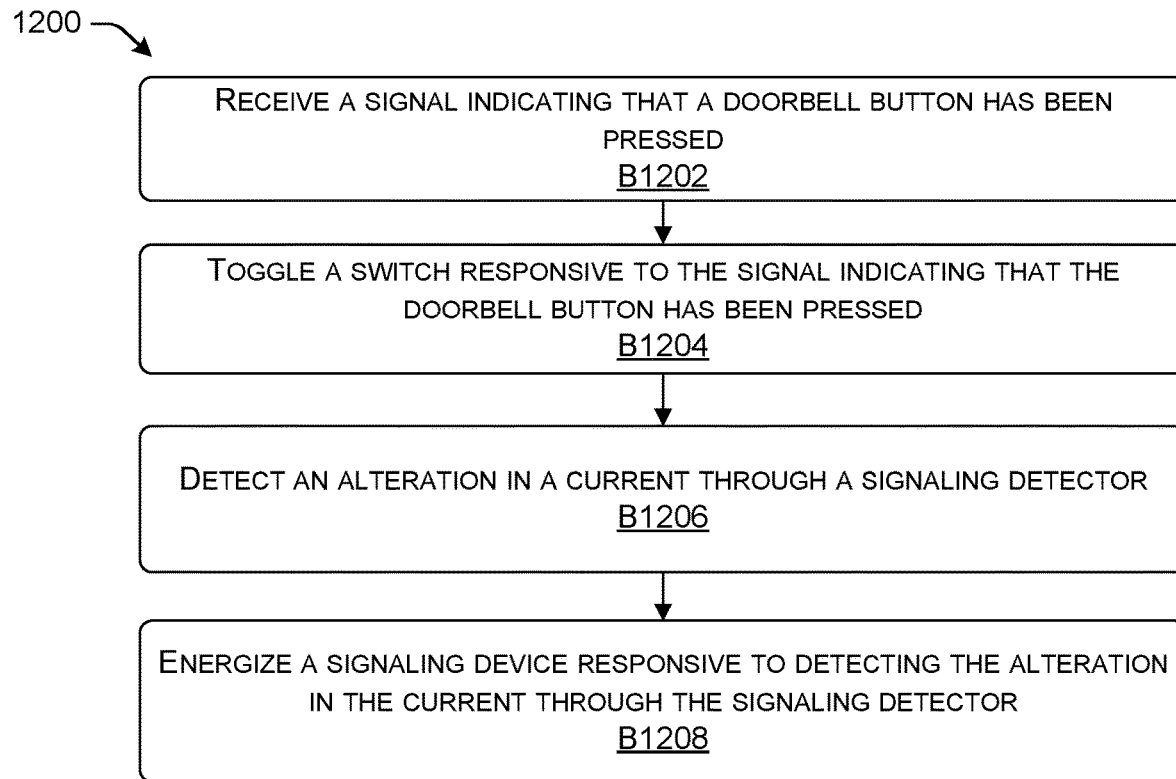
FIG. 12 is a flow diagram illustrating an example process for activating a signaling device, according to various aspects of the present disclosure.

FIG. 12 is a flow diagram illustrating an example process 1200 for activating a signaling device, according to various aspects of the present disclosure. At block B1202, a signal indicating that a doorbell button has been pressed may be received. This signal may be received by the A/V control logic 120. The signal may be generated by the doorbell button 124, such as by closing a circuit incorporated in the doorbell button 124.

At block B1204, a switch may be toggled responsive to the signal indicating that the doorbell button has been pressed. The switch may be the switch 210 connected in series with the A/V doorbell 106 or the switch 230 connected in parallel with the A/V doorbell 106. In some cases, the switch 210, 230 may be closed in response to the doorbell button 124 being pressed. The switch may be closed for a threshold amount of time and/or for a threshold portion or number of cycles of the AC waveform. For example, the A/V control logic 120 may alter and/or disrupt the AC waveform for one-eighth of a cycle, one-quarter of a cycle, one-half of a cycle, a full cycle, or any suitable predetermined number of cycles or part of a cycle. For example, if the AC waveform is a 60 Hz signal, and the A/V control logic 120 is to alter the AC waveform for a half of a cycle, then the switch 210, 230 may be actuated (e.g., closed) for 0.5*(1/60) seconds, or 8.33 ms.

At block B1206, an alteration in a current in a signaling detector may be detected. The signaling detector 214, such as in the form of a resistor, such as a current-sense resistor, or any other electronic device that presents an impedance, may be used by the signaling controller 132 to determine the current flowing therethrough. The current flowing through the signaling detector 214 may be altered when the switch 210 is toggled, such as when the switch 210 is closed.

At block B1208, a signaling device may be energized responsive to detecting the alteration in the current through the signaling detector. The signaling controller 132 may cause the signaling device 134 to make a sound for a predetermined amount of time. For example, the predetermined amount of time may be about two seconds when the signaling device 134 is mechanical, or about 4 seconds when the signaling device 134 is digital. These durations, however, are only example thresholds of time, and the threshold amount of time to energize the signaling device 134 may be any suitable duration.

Figure 13:
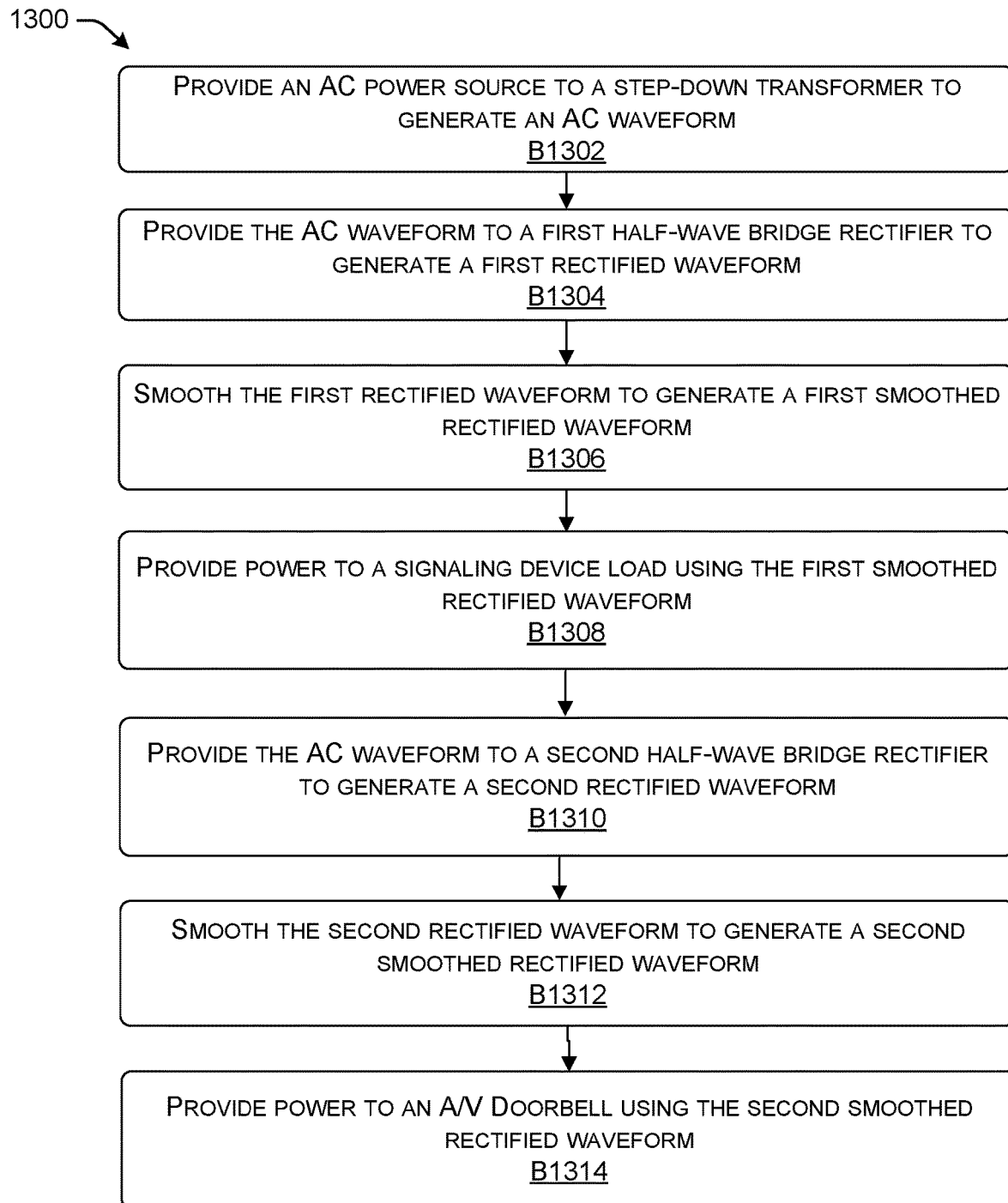
FIG. 13 is a flow diagram illustrating an example process for powering an A/V doorbell system with an AC power source using half-wave bridge rectifiers, according to various aspects of the present disclosure.

FIG. 13 is a flow diagram illustrating an example process 1300 for powering an A/V doorbell system with an AC power source using half-wave bridge rectifiers, according to various aspects of the present disclosure. The process 1300, at block B1302, includes providing an AC power source 116 to a step-down transformer 114 to generate an AC waveform. The AC waveform may be a voltage-scaled version of the AC power source 116. For example, the AC power source 116 may be 120 volts AC, and the AC waveform may be in the range of about 6 to 24 volts AC.

At block B1304, the AC waveform may be provided to a first half-wave bridge rectifier to generate a first rectified waveform. The first half-wave bridge rectifier may, as an example, be the first half-wave bridge rectifier 502. The first half-wave bridge rectifier 502 may include two diodes. The AC waveform of the doorbell circuit may be received by the first half-wave bridge rectifier 502 and rectified. For example, a positive phase of the AC waveform may be generated.

At block B1306, the first rectified waveform may be smoothed to generate a first smoothed rectified waveform. For example, the smoothing capacitor 520 may be electrically connected at the output of the first half-wave bridge rectifier 502. This smoothing capacitor 520 may smooth the output of the first half-wave bridge rectifier 502 to produce a DC or near DC (e.g., DC with ripples and/or noise) power supply. At block B1308, the first smoothed rectified waveform may be used to power a signaling device load. This signaling device load 130 may include various components, such as the signaling controller 132 and the signaling device 134.

At block B1310, the AC waveform may be provided to a second half-wave bridge rectifier to generate a second rectified waveform. The second half-wave bridge rectifier may, as an example, be the second half-wave bridge rectifier 510. The second half-wave bridge rectifier 510 may include two diodes. The AC waveform of the doorbell circuit may be received by the second half-wave bridge rectifier 510 and rectified. For example, a positive phase of the AC waveform may be generated.

At block B1312, the second rectified waveform may be smoothed to generate a second smoothed rectified waveform. For example, the smoothing capacitor 522 may be electrically connected at the output of the second half-wave rectifier 510. This smoothing capacitor 522 may smooth the output of the second half-wave rectifier 510 to produce a DC or near DC (e.g., DC with ripples and/or noise) power supply. At block B1314, the second smoothed rectified waveform may be used to power an A/V doorbell, such as the A/V doorbell 106.

Figure 14:
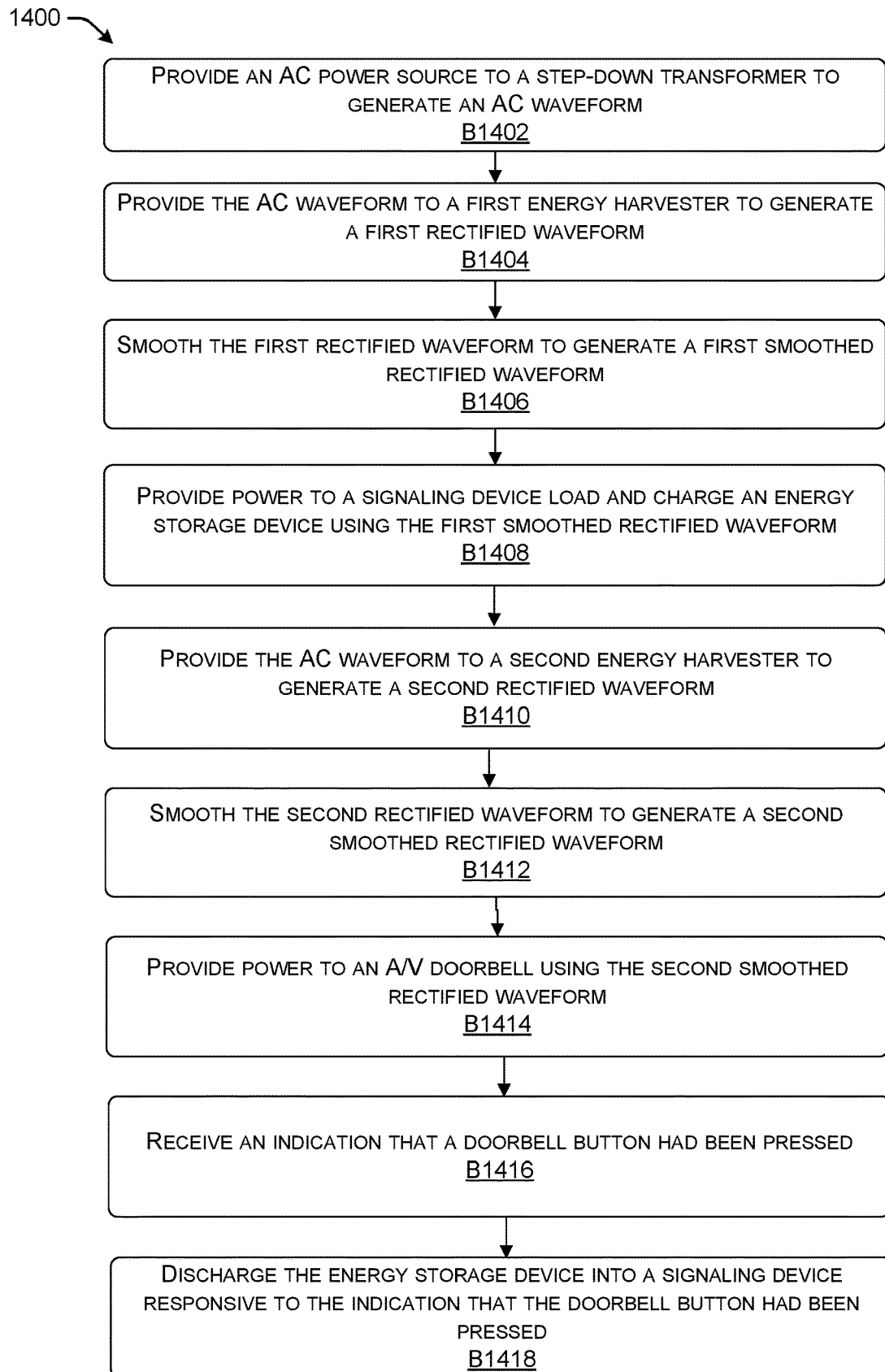
FIG. 14 is a flow diagram illustrating an example process for powering an A/V doorbell system with an AC power source using energy harvesters, according to various aspects of the present disclosure.

FIG. 14 is a flow diagram illustrating an example process 1400 for powering an A/V doorbell system with an AC power source using energy harvesters, according to various aspects of the present disclosure. The process 1400, at block B1402, includes providing an AC power source 116 to a step-down transformer 114 to generate an AC waveform. The AC waveform may be a voltage-scaled version of the AC power source 116. For example, the AC power source 116 may be 120 volts AC, and the AC waveform may be in the range of about 6 to 24 volts AC.

At block B1404, the AC waveform may be provided to a first energy harvester to generate a first rectified waveform. As an example, the first energy harvester may be the signaling energy harvester 602. The signaling energy harvester 602 may provide a rectified positive phase of the AC waveform, a portion of the positive phase of the AC waveform, a rectified negative phase of the AC waveform, or a portion of the negative phase of the AC waveform. In some cases, the signaling energy harvester 602 may use the bypass switch 606 to select portions of the AC waveform to use to power to the signaling device load 130 and, in other cases, the signaling energy harvester 602 may be in the form of a half-wave bridge rectifier 502.

At block B1406, the first rectified waveform may be smoothed to generate a first smoothed rectified waveform. A smoothing capacitor 520 may be electrically connected at the output of the first energy harvester. This smoothing capacitor 520 may smooth the output of the second half-wave rectifier 510 to produce a DC or near DC (e.g., DC with ripples and/or noise) power supply.

At block B1408, the first smoothed rectified waveform may be used to power a signaling device load and to charge an energy storage device. This signaling device load 130 may include various components, such as the signaling controller 132 and the signaling device 134. The energy storage device may be, for example, the battery or supercapacitor 612, 654.

At block B1410, the AC waveform may be provided to a second energy harvester to generate a second rectified waveform. In example embodiments, the second energy harvester may be the A/V doorbell energy harvester 604. The A/V doorbell energy harvester 604 may include one or more phase selections switches to select portions of the AC waveform to use to power the A/V doorbell 106. In other cases, the second energy harvester may be in the form of a half-bridge rectifier.

At block B1412, the second rectified waveform may be smoothed to generate a second smoothed rectified waveform. A smoothing capacitor 522 may be electrically connected at the output of the second energy harvester. This smoothing capacitor 522 may smooth the output of the second energy harvester to produce a DC or near DC (e.g., DC with ripples and/or noise) power supply. At block B1414, the second smoothed rectified waveform may be used to power an A/V doorbell, such as the A/V doorbell 106.

At block B1416, an indication may be received that a doorbell button has been pressed. This indication may be by way of a signal received by the A/V control logic 120. The signal may be generated by the doorbell button 124, such as by closing a circuit incorporated in the doorbell button 124. At block B1418, the energy storage device may be discharged into a signaling device responsive to the indication that the doorbell button has been pressed. This discharge operation may entail the signaling controller 132 closing the signal control switch 530.

The features of the present implementations described herein may be implemented in digital electronic circuitry, and/or in computer hardware, firmware, software, and/or in combinations thereof. Features of the present implementations may be implemented in a computer program product tangibly embodied in an information carrier, such as a machine-readable storage device, and/or in a propagated signal, for execution by a programmable processor. Implementations of the present method steps may be performed by a programmable processor executing a program of instructions to perform functions of the described implementations by operating on input data and generating output.

The features of the present implementations described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random-access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present implementations may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present implementations may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

As used herein, the phrases "at least one of A, B and C," "at least one of A, B, or C," and "A, B, and/or C" are synonymous and mean logical "OR" in the computer science sense. Thus, each of the foregoing phrases should be understood to read on (A), (B), (C), (A and B), (A and C), (B and C), and (A and B and C), where A, B, and C are variables representing elements or features of the claim. Also, while these examples are described with three variables (A, B, C) for ease of understanding, the same interpretation applies to similar phrases in these formats with any number of two or more variables.

The above description presents the best mode contemplated for carrying out the present implementations, and of the manner and process of practicing them, in such full, clear, concise, and exact terms as to enable any person skilled in the art to which they pertain to practice these implementations. The present implementations are, however, susceptible to modifications and alternate constructions from those discussed above that are fully equivalent. Consequently, the present invention is not limited to the particular implementations disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative implementations be performed concurrently. Likewise, steps that have been presented as being performed concurrently may in alternative implementations be performed separately.

EXAMPLE CLAUSES

In a first aspect, an audio/video (A/V) recording and communication doorbell system ("A/V doorbell system") comprises: an alternating current (AC) power source; a transformer receiving the AC power source and outputting an AC waveform; a signaling device load including a signaling device and a signaling controller; a first electronic device to provide power to the signaling device load with a first portion of the AC waveform; an A/V doorbell including a doorbell button and A/V control logic, the A/V doorbell connected in series with the signaling device load; a second electronic device to provide power to the A/V doorbell with a second portion of the AC waveform, the second portion of the AC waveform non-overlapping with the first portion of the AC waveform; a switch to be toggled responsive to a control signal generated by the A/V control logic, the control signal generated responsive to detecting that the doorbell button is pressed; and a signaling detector through which a current passes, the current altered when the switch is toggled, and the signaling controller is configured to detect the current through the signaling detector and cause the signaling device to generate a sound when the current is altered.

In an embodiment of the first aspect, the electronic device comprises a second switch controllable by the signaling controller.

In a second aspect, an audio/video (A/V) recording and communication doorbell device ("A/V doorbell") circuit comprises: an A/V doorbell including a doorbell button and A/V control logic; and an electronic device configured to provide power to the A/V doorbell with a first portion of an AC waveform, and a second portion of the AC waveform opposing the first portion of the AC waveform is to power a signaling device, and the A/V control logic is configured to determine that the doorbell button has been pressed, and responsive to the doorbell button being pressed, modify the AC waveform to generate a modified AC waveform.

In an embodiment of the second aspect, the electronic device comprises one or more diodes to generate the first portion of the AC waveform.

In another embodiment of the second aspect, the first portion of the AC waveform is a positive phase of the AC waveform and the second portion of the AC waveform is a negative phase of the AC waveform.

In another embodiment of the second aspect, the electronic device comprises a switch controllable by the A/V control logic.

In another embodiment of the second aspect, a first amount of power provided by the first portion of the AC waveform is different from a second amount of power provided by the second portion of the AC waveform.

In another embodiment of the second aspect, the electronic device is a first electronic device, and further comprising a second electronic device to generate the second portion of the AC waveform.

In another embodiment of the second aspect, the A/V doorbell circuit further comprising a signaling controller, wherein the second electronic device comprises a second switch controllable by the signaling controller.

In another embodiment of the second aspect, the signaling controller is configured to: detect the modified AC waveform; and energize, based at least in part on the modified AC waveform, the signaling device.

In another embodiment of the second aspect, the A/V doorbell circuit further comprising a signaling detector through which a current passes, the current monitored by the signaling controller to detect the modified AC waveform.

In another embodiment of the second aspect, the A/V doorbell circuit further comprising a switch to be toggled responsive to a control signal generated by the A/V control logic, the control signal generated responsive to the A/V control logic determining that the doorbell button has been pressed.

In another embodiment of the second aspect, the switch is toggled for at least half of a cycle of the AC waveform.

In another embodiment of the second aspect, the A/V control logic is further configured to: receive a signal indicating that the doorbell button has been pressed; generate the control signal responsive to the signal indicating that the doorbell button has been pressed; and provide the control signal to the switch.

In another embodiment of the second aspect, the A/V doorbell circuit further comprising a smoothing capacitor connected to the electronic device to smooth the first portion of the AC waveform.

In a third aspect, a method comprising: determining, by an audio/video (A/V) recording and communication doorbell device ("A/V doorbell"), that a doorbell button has been pressed, the A/V doorbell powered by a first portion of an alternating current (AC) waveform; causing, by the A/V doorbell and in response to determining that the doorbell button has been pressed, an alteration in a second portion of the AC waveform; detecting, by a signaling device controller powered by the second portion of the AC waveform, the alteration in the second portion of the AC waveform; and energizing, by the signaling device controller and in response to detecting the alteration in the second portion of the AC waveform, a signaling device.

In an embodiment of the third aspect, energizing the signaling device further comprises: causing a signal control switch to close to provide power to the signaling device from the second portion of the AC waveform.

In another embodiment of the third aspect, causing the alteration in the second portion of the AC waveform further comprises: actuating a switch for a period of at least a quarter of a cycle of the AC waveform.

In another embodiment of the third aspect, the method further comprising: generating the first portion of the AC waveform by applying the AC waveform to a first switch configured to be modulated to allow the first portion of the AC waveform to flow; and generating the second portion of the AC waveform by applying the AC waveform to a second switch configured to be modulated to allow the second portion of the AC waveform to flow.

In another embodiment of the third aspect, the first portion of the AC waveform is a greater proportion of the AC waveform than the second portion of the AC waveform.

In a fourth aspect, an audio/video (A/V) recording and communication doorbell system ("A/V doorbell system") comprising: an alternating current (AC) power source; a transformer receiving the AC power source and outputting an AC waveform; a signaling device load including a signaling device and a signaling controller; a first half-wave bridge rectifier to provide power to the signaling device load with a first phase of the AC waveform, the first half-wave bridge rectifier comprising a first diode and a second diode, the AC waveform provided to the first diode and the first phase of the AC waveform output from the second diode; an A/V doorbell including a doorbell button and A/V control logic; a second half-wave bridge rectifier to provide power to the A/V doorbell with a second phase of the AC waveform, the second half-wave bridge rectifier comprising a third diode and a fourth diode, the AC waveform provided to the third diode and the second phase of the AC waveform output from the fourth diode; a switch to be toggled responsive to a control signal generated by the A/V control logic, the control signal generated responsive to detecting that the doorbell button is pressed; and a signaling detector through which a current passes, the current altered when the switch is toggled, wherein the signaling controller is configured to detect the current through the signaling detector and cause the signaling device to generate a sound when the current is altered.

In an embodiment of the fourth aspect, the switch is connected between a first node and a second node, the first node defined by the connection of the third diode with the fourth diode, the second node defined by a connection of the first diode and the second diode.

In another embodiment of the fourth aspect, the switch is connected in parallel with the third diode.

In another embodiment of the fourth aspect, the control signal causes the switch to close to shunt the current across the third diode.

In a fifth aspect, an audio/video (A/V) recording and communication doorbell device ("A/V doorbell") circuit comprising: a first half-wave bridge rectifier configured to provide power to a signaling device load with a first phase of an AC waveform, the first half-wave bridge rectifier comprising a first diode and a second diode, the AC waveform provided to the first diode and the first phase of the AC waveform output from the second diode, the first phase comprising one of a positive or a negative phase of the AC waveform; an A/V doorbell; and a second half-wave bridge rectifier to provide power to the A/V doorbell with a second phase of the AC waveform, the second half-wave bridge rectifier comprising a third diode and a fourth diode, the AC waveform provided to the third diode and the second phase of the AC waveform output from the fourth diode, the second phase comprising an opposing one of the positive or the negative phase of the AC waveform.

In an embodiment of the fifth aspect, the signaling device load includes a signaling controller, the A/V doorbell includes a doorbell button and A/V control logic, and the A/V control logic is configured to: determine that the doorbell button has been pressed; and cause the first portion of the AC waveform to be altered; and the signaling controller is configured to: detect an alteration in the first portion of the AC waveform; and cause a signaling device to make a sound.

In another embodiment of the fifth aspect, the A/V doorbell circuit further comprising: a signal control switch, the signaling controller to close the signal control switch to provide power to the signaling device.

In another embodiment of the fifth aspect, the A/V doorbell circuit further comprising: a switch to be toggled responsive to a control signal generated by the A/V control logic, the control signal generated responsive to detecting that the doorbell button has been pressed; and a signaling detector through which a current passes, the current altered when the switch is toggled, and the signaling controller is configured to detect the current through the signaling detector and cause the signaling device to generate the sound when the current is altered In another embodiment of the fifth aspect, the switch is toggled for at least a quarter of a cycle of the AC waveform.

In another embodiment of the fifth aspect, the switch is connected in parallel with the third diode.

In another embodiment of the fifth aspect, the switch is connected between a first node and a second node, the first node defined by the connection of the third diode with the fourth diode, the second node defined by a connection of the first diode and the second diode.

In another embodiment of the fifth aspect, the first phase of the AC waveform is the positive phase of the AC waveform and the second phase of the AC waveform is the negative phase of the AC waveform.

In another embodiment of the fifth aspect, the A/V doorbell circuit further comprising a smoothing capacitor connected to the fourth diode to smooth the second phase of the AC waveform.

In another embodiment of the fifth aspect, the A/V doorbell circuit further comprising a smoothing capacitor connected to the second diode to smooth the first phase of the AC waveform.

In a sixth aspect, method comprising: determining, by an audio/video (A/V) recording and communication doorbell device ("A/V doorbell"), that a doorbell button has been pressed, the A/V doorbell powered by a first phase of an alternating current (AC) waveform, the first phase of the AC waveform generated by a first half-wave bridge rectifier; causing, by the A/V doorbell and in response to determining that the doorbell button has been pressed, an alteration in a second phase of the AC waveform, the second phase of the AC waveform generated by a second half-wave bridge rectifier; detecting, by a signaling device controller powered by the second phase of the AC waveform, the alteration in the second phase of the AC waveform; and energizing, by the signaling device controller and in response to detecting the alteration in the second phase of the AC waveform, a signaling device.

In an embodiment of the sixth aspect, energizing the signaling device further comprises: causing a signal control switch to close to provide power to the signaling device from the second portion of the AC waveform.

In another embodiment of the sixth aspect, causing the alteration in the second phase of the AC waveform further comprises:

actuating a switch for a period of at least a quarter of a cycle of the AC waveform.

In another embodiment of the sixth aspect, the first half-wave bridge rectifier comprises a diode, and wherein the switch is connected in parallel with the diode.

In another embodiment of the sixth aspect, the first half-wave bridge rectifier comprises a diode, and wherein the switch is connected in series with the diode.

In another embodiment of the sixth aspect, determining that the doorbell button has been pressed comprises receiving a signal corresponding to the doorbell button being pressed.

In a seventh aspect, an audio/video (A/V) recording and communication doorbell system ("A/V doorbell system") comprising: an alternating current (AC) power source; a transformer receiving the AC power source and outputting an AC waveform; a first energy harvester configured to harvest energy from a first portion of the AC waveform to charge an energy storage device to store an amount of energy; a second energy harvester configured to harvest energy from a second portion of the AC waveform; a signaling device load including a signaling device and a signaling controller, the signaling controller powered by the first energy harvester; an A/V doorbell including a doorbell button and A/V control logic, the A/V doorbell powered by the second energy harvester; a switch to be toggled responsive to a control signal generated by the A/V control logic, the control signal generated responsive to detecting that the doorbell button is pressed; and a signaling detector through which a current passes, the current altered when the switch is toggled, wherein the signaling controller is configured to: detect the current through the signaling detector being altered; and cause, responsive to the current being altered, the energy storage device to discharge the amount of energy into the signaling device to generate a sound.

In an embodiment of the seventh aspect, the first energy harvester comprises a first half-wave bridge rectifier, the first half-wave bridge rectifier comprising a first diode and a second diode, the AC waveform provided to the first diode and the first portion of the AC waveform output from the second diode; and the second energy harvester comprises a second half-wave bridge rectifier, the second half-wave bridge rectifier comprising a third diode and a fourth diode, the AC waveform provided to the third diode and the second portion of the AC waveform output from the fourth diode.

In another embodiment of the seventh aspect, the switch is connected in parallel with the third diode.

In another embodiment of the seventh aspect, the switch is connected between a first node and a second node, the first node defined by the connection of the third diode with the fourth diode, the second node defined by a connection of the first diode and the second diode.

In an eighth aspect, an audio/video (A/V) recording and communication doorbell device ("A/V doorbell") circuit comprising: a first energy harvester configured to harvest energy from a first portion of an AC waveform to charge an energy storage device to store an amount of energy, the energy storage device configured to provide the amount of energy to a signaling device; a second energy harvester configured to harvest energy from a second portion of the AC waveform; and an A/V doorbell including a doorbell button and A/V control logic, the A/V doorbell powered by the second energy harvester, the A/V control logic configured to indicate to a signaling controller that the doorbell button has been pressed.

In an embodiment of the eighth aspect, the A/V control logic is configured to: determine that the doorbell button has been pressed; and cause the first portion of the AC waveform to be altered; and the signaling controller is configured to: detect an alteration in the first portion of the AC waveform; and cause a signal control switch to close to discharge the amount of energy from the energy storage device into the signaling device to make a sound.

In an embodiment of the eighth aspect, A/V doorbell circuit further comprising: a switch to be toggled responsive to a control signal generated by the A/V control logic, the control signal generated responsive to detecting that the doorbell button has been pressed; and a signaling detector through which a current passes, the current altered when the switch is toggled, and the signaling controller is configured to detect the current through the signaling detector and, responsive to detecting the alteration in the first portion of the AC waveform, cause a signal control switch to close.

In an embodiment of the eighth aspect, the second energy harvester comprises a half-wave bridge rectifier comprising a first diode and a second diode, the AC waveform provided to the first diode and the second portion of the AC waveform output from the second diode.

In an embodiment of the eighth aspect, the first phase of the AC waveform is the positive phase of the AC waveform and the second phase of the AC waveform is the negative phase of the AC waveform.

In an embodiment of the eighth aspect, the energy storage device is at least one of a battery or a supercapacitor.

In an embodiment of the eighth aspect, the A/V doorbell circuit further comprising a bypass switch controlled by the first energy harvester to harvest the energy from the first portion of an AC waveform.

In an embodiment of the eighth aspect, the first energy harvester comprises a half-wave bridge rectifier comprising a first diode and a second diode, the AC waveform provided to the first diode and the first portion of the AC waveform output from the second diode.

In an embodiment of the eighth aspect, the A/V doorbell circuit further comprising a smoothing capacitor connected to the first energy harvester to smooth the first portion of the AC waveform.

In a ninth aspect, a method comprising: determining, by an audio/video (A/V) recording and communication doorbell device ("A/V doorbell"), that a doorbell button has been pressed, the A/V doorbell powered by a first portion of an alternating current (AC) waveform, the first portion of the AC waveform generated by a first energy harvester; causing, by the A/V doorbell and in response to determining that the doorbell button has been pressed, an alteration in a second portion of the AC waveform, the second portion of the AC waveform generated by a second energy harvester; detecting, by a signaling device controller powered by the second portion of the AC waveform, the alteration in the second portion of the AC waveform; and discharging, by an energy storage device charged by the second energy harvester, and in response to the signaling device controller detecting the alteration in the second portion of the AC waveform, an amount of energy into the signaling device to cause the signaling device.

In an embodiment of the ninth aspect, discharging the amount of energy into the signaling device further comprises: causing, by the signaling device controller, a signal control switch to close to discharge the amount of energy from the energy storage device into the signaling device.

In another embodiment of the ninth aspect, causing the alteration in the second phase of the AC waveform further comprises: actuating a switch for a period of at least a quarter of a cycle of the AC waveform.

In another embodiment of the ninth aspect, the first energy harvester comprises a diode, and wherein the switch is connected in parallel with the diode.

In another embodiment of the ninth aspect, the switch is connected in series with the first energy harvester.

In another embodiment of the ninth aspect, determining that the doorbell button has been pressed comprises receiving a signal corresponding to the doorbell button being pressed.

In another embodiment of the ninth aspect, the method further comprising: receiving AC source power; and generating the AC waveform by applying the AC source power to a step-down transformer.

What is claimed is:

1. An audio/video (A/V) recording and communication doorbell system (A/V doorbell system) comprising:
    a signaling device load connected in a doorbell circuit;
    a first electronic device configured to provide first power to the signaling device load with a first portion of an alternating current (AC) power waveform;
    an A/V doorbell including a doorbell button, a speaker, and a camera, the A/V doorbell connected in series with the signaling device load;
    a second electronic device configured to provide second power to the A/V doorbell with a second portion of the AC power waveform, the second portion of the AC power waveform non-overlapping with the first portion of the AC power waveform;
    a signaling detector through which a current passes;
    a signaling device; and
    a signaling controller configured to detect the current through the signaling detector and cause the signaling device to generate a sound when the current is altered.

2. The A/V doorbell system of claim 1, wherein:
    the first electronic device comprises a first diode configured to provide the first portion of the AC power waveform to the signaling device load, the first portion comprising one of a positive phase or a negative phase of the AC power waveform; and
    the second electronic device comprises a second diode configured to provide the second portion of the AC power waveform to the A/V doorbell, the second portion comprising a different one of the positive phase or the negative phase of the AC power waveform.

3. An audio/video (A/V) recording and communication doorbell system (A/V doorbell system) comprising:
    an A/V doorbell comprising:
        a doorbell button;
        a speaker;
        one or more processors; and
        one or more non-transitory computer-readable media storing instructions that, when executed by the one or more processors, cause the one or more processors to perform operations comprising determining that the doorbell button has received an input;
    a first electronic device configured to provide a first portion of an alternating current (AC) power waveform to the A/V doorbell; and
    a controller configured to:
        detect a modification associated with the AC power waveform effected based at least in part on the doorbell receiving the input; and
        based at least in part on the modification, cause a second electronic device to provide a second portion of the AC power waveform to a signaling device, the second portion of the AC power waveform being different than the first portion of the AC power waveform.

4. The A/V doorbell system of claim 3, wherein the first electronic device comprises a diode to provide the first portion of the AC power waveform to the A/V doorbell.

5. The A/V doorbell system of claim 3, wherein the first portion of the AC power waveform is a positive phase of the AC power waveform and the second portion of the AC power waveform is a negative phase of the AC waveform.

6. The A/V doorbell system of claim 3, wherein:
    the first electronic device comprises a first switch that provides the first portion of the AC power waveform to the A/V doorbell; and
    the second electronic device comprises a second switch that provides the second portion of the AC power waveform to the signaling device.

7. The A/V doorbell system as recited in claim 3, further comprising the signaling device, the signaling device comprising at least one of:
    a device that includes a speaker; or
    a chime.

8. The A/V doorbell system as recited in claim 3, wherein:
    the first electronic device comprises a first rectifier that converts the first portion of the AC waveform that is provided to the A/V doorbell; and
    the second electronic device comprises a second rectifier that converts the second portion of the A/C waveform that is provided to the signaling device.

9. The A/V doorbell system as recited in claim 3, wherein the first electronic device is further configured to receive at least the first portion of the AC power waveform from a transformer.

10. The A/V doorbell system as recited in claim 3, wherein:
    the first electronic device is further configured to receive the AC power waveform from an external power source; and
    the second electronic device is further configured to receive at least the second portion of the AC power waveform from the first electronic device.

11. The A/V doorbell system as recited in claim 3, wherein:
the first electronic device comprises a first energy harvester configured to provide the first portion of the AC power waveform to the A/V doorbell; and
the second electronic device comprises a second energy harvester configured to provide the second portion of the AC power waveform to the signaling device.

12. The A/V doorbell system as recited in claim 3, wherein:
the first electronic device comprises a first transistor configured to provide the first portion of the AC power waveform to the A/V doorbell; and
the second electronic device comprises a second transistor configured to provide the second portion of the AC power waveform to the signaling device.

13. The A/V doorbell system as recited in claim 3, further comprising an electrical connection between the first electronic device and the A/V doorbell, wherein the first electronic device is configured to provide the first portion of the AC power waveform to the A/V doorbell using the electronic connection.

14. The A/V doorbell system as recited in claim 3, wherein the A/V doorbell further comprises a housing, and wherein the first electronic device is located outside of the housing.

15. The A/V doorbell system as recited in claim 3, wherein the one or more non-transitory computer-readable media store instructions that, when executed by the one or more processors, cause the one or more processors to determine that the doorbell button has received an input using a process comprising at least:
receiving a signal from the doorbell button; and
determining that the signal satisfies a threshold.

16. The A/V doorbell system as recited in claim 1, wherein:
the signaling controller includes an electrical connection with the signaling detector; and
the signaling controller is configured to detect that the current has been altered using a process comprising detecting, using the electrical connection, a drop in voltage across the signaling detector.

17. The A/V doorbell as recited in claim 1, further comprising:
a switch coupled to the signaling device,
wherein the signaling controller is configured to cause the signaling device to generate the sound by sending, to the switch, a signal that causes the switch to close.

18. The A/V doorbell system as recited in claim 3, wherein:
the first electronic device is configured to provide the first portion of the AC power waveform to the A/V doorbell by at least closing a first switch; and
the second electronic device is configured to provide the second portion of the AC power waveform to the signaling device by at least closing a second switch.

19. The A/V doorbell system as recited in claim 3, wherein the controller configured to detect the modification associated with the AC power waveform is configured to effect such detection using a process comprising:
determining, at a first time, a first voltage associated with the AC power waveform;
determining, at a second time, a second voltage associated with the AC power waveform; and
determining that the first voltage is different than the second voltage.

20. The A/V doorbell system as recited in claim 3, further comprising:
a signaling detector through which the AC power waveform passes,
wherein the controller configured to detect the modification associated with the AC power waveform is configured to effect such detection using a process comprising:
determining, at a first time, a first current associated with the signaling detector;
determining, at a second time, a second current associated with the signaling detector; and
determining that the first current is different than the second current.

21. An audio/video (A/V) recording and communication doorbell system (A/V doorbell system) comprising:
an A/V doorbell comprising:
a doorbell button;
a speaker;
one or more processors; and
one or more non-transitory computer-readable media storing instructions that, when executed by the one or more processors, cause the one or more processors to perform operations comprising determining that the doorbell button has received an input;
a first electronic device configured to provide a first portion of an alternating current (AC) power waveform to the A/V doorbell, the first electronic device comprising at least one of a first switch, a first rectifier, a first energy harvester, or a first transistor; and
a second electronic device configured to provide, based at least in part on the input, a second portion of the AC power waveform to a signaling device, the second electronic device comprising at least one of a second switch, a second rectifier, a second energy harvester, or a second transistor,
wherein the second portion of the AC power waveform is different than the first portion of the AC power waveform.

22. The A/V doorbell system as recited in claim 21, wherein:
the first electronic device is further configured to receive the AC power waveform from an external power source; and
the second electronic device is further configured to receive at least the second portion of the AC power waveform from the first electronic device.

23. The A/V doorbell system as recited in claim 21, further comprising an electrical connection between the first electronic device and the A/V doorbell, wherein the first electronic device is configured to provide the first portion of the AC power waveform to the A/V doorbell using the electronic connection.

24. The A/V doorbell system as recited in claim 21, further comprising a controller configured to:
detect a modification associated with the AC power waveform; and
based at least in part on the modification, cause the second electronic device to provide the second portion of the AC power waveform to the signaling device.

25. The A/V doorbell system as recited in claim 24, wherein the controller configured to detect a modification associated with the AC power waveform is configured to effect such detection using a process comprising:
determining, at a first time, a first voltage associated with the AC power waveform;

determining, at a second time, a second voltage associated with the AC power waveform; and determining that the first voltage is different than the second voltage.

26. The A/V doorbell system as recited in claim 21, wherein the A/V doorbell further comprises at least one of:
one or more microphones;
one or more motion sensors;
a light sensor;
a light emitter; or
a network interface.

27. The A/V doorbell system as recited in claim 21, wherein the first electronic device and the second electronic device are configured to provide, for each respective cycle of a plurality of cycles of the AC power waveform, a first portion of the respective cycle of the AC power waveform to the A/V doorbell and a second, non-overlapping portion of the respective cycle of the AC power waveform to a signaling device load.

28. The A/V doorbell system as recited in claim 21,
wherein the first electronic device and the second electronic device are configured to
provide, for a first set of one or more cycles of the AC power waveform, a first portion of the first set of one or more cycles of the AC power waveform to the A/V doorbell and a second, non-overlapping portion of the first set of one or more cycles of the AC power waveform to a signaling device load, and
provide, for a second set of one or more cycles of a power waveform, a first portion of the second set of one or more cycles of the AC power waveform to the A/V doorbell and a second, non-overlapping portion of the second set of one or more cycles of the AC power waveform to a signaling device load;
wherein the provided first portion of the first set of one or more cycles of the AC power waveform and the provided first portion of the second set of one or more cycles of the AC power waveform are each the same portion of their respective set of one or more cycles of the AC power waveform; and
wherein the provided second portion of the first set of one or more cycles of the AC power waveform and the provided second portion of the second set of one or more cycles of the AC power waveform are each the same portion of their respective set of one or more cycles of the AC power waveform.

29. The A/V doorbell system as recited in claim 3, wherein the first electronic device and the second electronic device are configured to provide, for each respective cycle of a plurality of cycles of the AC power waveform, a first portion of the respective cycle of the AC power waveform to the A/V doorbell and a second, non-overlapping portion of the respective cycle of the AC power waveform to a signaling device load.

30. The A/V doorbell system as recited in claim 3,
wherein the first electronic device and the second electronic device are configured to
provide, for a first set of one or more cycles of the AC power waveform, a first portion of the first set of one or more cycles of the AC power waveform to the A/V doorbell and a second, non-overlapping portion of the first set of one or more cycles of the AC power waveform to a signaling device load, and
provide, for a second set of one or more cycles of a power waveform, a first portion of the second set of one or more cycles of the AC power waveform to the A/V doorbell and a second, non-overlapping portion of the second set of one or more cycles of the AC power waveform to a signaling device load;
wherein the provided first portion of the first set of one or more cycles of the AC power waveform and the provided first portion of the second set of one or more cycles of the AC power waveform are each the same portion of their respective set of one or more cycles of the AC power waveform; and
wherein the provided second portion of the first set of one or more cycles of the AC power waveform and the provided second portion of the second set of one or more cycles of the AC power waveform are each the same portion of their respective set of one or more cycles of the AC power waveform.

\* \* \* \* \*